| (12) | United States Patent<br>Winklevoss et al. | (10) Patent No.: US 10,693,632 B1<br>(45) Date of Patent: Jun. 23, 2020 |
|---|---|---|

(54) AUTONOMOUS DEVICES

(71) Applicant: WINKLEVOSS IP, LLC, Wilmington, DE (US)

(72) Inventors: Cameron Howard Winklevoss, New York, NY (US); Tyler Howard Winklevoss, New York, NY (US)

(73) Assignee: WINKLEVOSS IP, LLC, Wilmington, DE (US)

( * ) Notice: Subject to any disclaimer, the term of this patent is extended or adjusted under 35 U.S.C. 154(b) by 0 days.

(21) Appl. No.: 16/178,988

(22) Filed: Nov. 2, 2018

Related U.S. Application Data

(63) Continuation of application No. 15/071,902, filed on Mar. 16, 2016, now Pat. No. 10,158,480.

(Continued)

(51) Int. Cl.
*H04L 29/06* (2006.01)
*H04L 9/08* (2006.01)
*H04L 12/28* (2006.01)

(52) U.S. Cl.
CPC ........ *H04L 9/0825* (2013.01); *H04L 12/2803* (2013.01)

(58) Field of Classification Search
CPC ...... G06F 17/3033; H04L 9/08; H04L 9/0643
See application file for complete search history.

(56) References Cited

U.S. PATENT DOCUMENTS

| 4,790,431 A | 12/1988 | Reel et al. |
| 5,675,649 A | 10/1997 | Brennan et al. |

(Continued)

FOREIGN PATENT DOCUMENTS

| CA | 2627540 A1 | 9/2009 |
| CN | 103927656 | 7/2014 |

(Continued)

OTHER PUBLICATIONS

Nick Szabo, Bit gold, unenumerated.blogspot.com (Mar. 29, 2006) Internet Archive, https://web.archive.org/web/20060329122942/http://unenumerated.blogspot.com/2005/12/bit-gold.html.

(Continued)

*Primary Examiner* — Joseph P Hirl
*Assistant Examiner* — Leynna Truvan
(74) *Attorney, Agent, or Firm* — Amster, Rothstein & Ebenstein LLP

(57) ABSTRACT

Autonomous devices and systems, methods, and program products for authorizing and performing autonomous devices transactions are disclosed. An autonomous device can be configured to generate a first hash value of a chain of hash values by applying a hash algorithm to first data including first new data and a first previous hash value of the chain of hash values, the first previous hash value computed by applying the hash algorithm to first previous data. The device can transmit to a transaction computer system the first hash value and the first new data. The device can generate and transmit to the transaction computer system a first signed electronic transaction request comprising first transaction data comprising a sending account identifier associated with the autonomous device, a destination account identifier, a transaction amount, and a timestamp. The device can digitally sign the transaction request using a private key of an asymmetric key pair.

20 Claims, 16 Drawing Sheets

Related U.S. Application Data

(60) Provisional application No. 62/133,978, filed on Mar. 16, 2015.

(56) References Cited

U.S. PATENT DOCUMENTS

| | | |
|---|---|---|
| 5,799,287 A | 8/1998 | Dembo |
| 5,950,176 A | 9/1999 | Keiser et al. |
| 6,021,257 A | 2/2000 | Chikauchi |
| 6,157,920 A | 12/2000 | Jakobsson et al. |
| 6,505,174 B1 | 1/2003 | Keiser et al. |
| 6,523,012 B1 | 2/2003 | Glassman et al. |
| 6,583,712 B1 | 6/2003 | Reed et al. |
| 7,167,565 B2 | 1/2007 | Rajasekaran |
| 7,330,538 B2 | 2/2008 | Dunsmuir |
| 7,391,865 B2 | 6/2008 | Orsini et al. |
| 7,487,123 B1 | 2/2009 | Keiser et al. |
| 7,677,974 B2 | 3/2010 | Van Luchene |
| 7,716,484 B1 | 5/2010 | Kaliski, Jr. |
| 7,870,058 B2 | 1/2011 | Maltzman |
| 7,873,573 B2 | 1/2011 | Realini |
| 7,999,748 B2 | 8/2011 | Ligtenberg et al. |
| 8,108,278 B2 | 1/2012 | Tzekin et al. |
| 8,108,283 B2 | 1/2012 | Dimitri et al. |
| 8,139,770 B2 | 3/2012 | Zheng et al. |
| 8,224,702 B2 | 7/2012 | Mengerink et al. |
| 8,229,855 B2 | 7/2012 | Huang et al. |
| 8,229,859 B2 | 7/2012 | Samid |
| 8,239,330 B2 | 8/2012 | Montero et al. |
| 8,249,965 B2 | 8/2012 | Tumminaro |
| 8,255,297 B2 | 8/2012 | Morgenstern et al. |
| 8,275,692 B2 | 9/2012 | Cartledge et al. |
| 8,306,910 B2 | 11/2012 | Wilkes |
| 8,326,751 B2 | 12/2012 | Driemeyer et al. |
| 8,352,326 B2 | 1/2013 | Betzler et al. |
| 8,452,703 B2 | 5/2013 | O'Leary et al. |
| 8,606,685 B2 | 12/2013 | Keiser et al. |
| 8,630,951 B2 | 1/2014 | Wilkes |
| 8,688,525 B2 | 4/2014 | Minde |
| 8,688,563 B2 | 4/2014 | Mehew et al. |
| 8,712,914 B2 | 4/2014 | Lyons et al. |
| 8,719,131 B1 | 5/2014 | Roth et al. |
| 9,276,740 B2 | 3/2016 | Nix |
| 9,288,059 B2 | 3/2016 | Nix |
| 9,350,550 B2 | 5/2016 | Nix |
| 9,641,327 B2 | 5/2017 | Nix |
| 9,698,981 B2 | 7/2017 | Nix |
| 9,749,297 B2* | 8/2017 | Gvili .................. H04L 63/0428 |
| 9,794,074 B2 | 10/2017 | Toll et al. |
| 10,084,762 B2 | 9/2018 | Versteeg et al. |
| 2002/0143614 A1 | 10/2002 | MacLean et al. |
| 2002/0171546 A1 | 11/2002 | Evans et al. |
| 2003/0009413 A1 | 1/2003 | Furbush et al. |
| 2003/0014749 A1 | 1/2003 | Simons et al. |
| 2003/0225672 A1 | 12/2003 | Hughes et al. |
| 2004/0049464 A1 | 3/2004 | Ohmori et al. |
| 2004/0098609 A1 | 5/2004 | Bracewell et al. |
| 2004/0143710 A1 | 7/2004 | Walmsley |
| 2004/0193657 A1 | 9/2004 | Saito et al. |
| 2004/0243488 A1 | 12/2004 | Yamamoto et al. |
| 2004/0260949 A1 | 12/2004 | Aoki et al. |
| 2005/0044022 A1 | 2/2005 | Spirgel et al. |
| 2005/0240510 A1 | 10/2005 | Schweickert et al. |
| 2006/0218625 A1 | 9/2006 | Pearson et al. |
| 2007/0117615 A1 | 5/2007 | Van Luchene |
| 2007/0146797 A1 | 6/2007 | Sakai et al. |
| 2007/0219869 A1 | 9/2007 | Haines et al. |
| 2007/0271455 A1 | 11/2007 | Nakano et al. |
| 2008/0109280 A1 | 5/2008 | Csoka |
| 2008/0120221 A1 | 5/2008 | Toneguzzo |
| 2008/0140578 A1 | 6/2008 | Felt et al. |
| 2008/0159318 A1 | 7/2008 | Pierlot et al. |
| 2008/0167965 A1 | 7/2008 | Von Nothaus et al. |
| 2008/0215474 A1 | 9/2008 | Graham et al. |
| 2008/0243703 A1 | 10/2008 | Al-Herz et al. |
| 2008/0249957 A1 | 10/2008 | Masuyama et al. |
| 2008/0281444 A1 | 11/2008 | Krieger et al. |
| 2009/0089168 A1 | 4/2009 | Schneck |
| 2009/0094134 A1 | 4/2009 | Toomer et al. |
| 2009/0098939 A1 | 4/2009 | Hamilton, II et al. |
| 2009/0119200 A1 | 5/2009 | Riviere |
| 2009/0132830 A1 | 5/2009 | Haga et al. |
| 2009/0265268 A1 | 10/2009 | Huang et al. |
| 2010/0094771 A1 | 4/2010 | VanderPal |
| 2010/0146290 A1 | 6/2010 | Bachmann et al. |
| 2010/0174646 A1 | 7/2010 | Cole et al. |
| 2010/0228674 A1 | 9/2010 | Ogg et al. |
| 2010/0250360 A1 | 9/2010 | Ball et al. |
| 2010/0306084 A1 | 12/2010 | Ciptawilangga |
| 2011/0110516 A1 | 5/2011 | Satoh |
| 2011/0112662 A1 | 5/2011 | Thompson et al. |
| 2011/0231913 A1 | 9/2011 | Feng et al. |
| 2011/0270748 A1 | 11/2011 | Graham, III et al. |
| 2011/0302412 A1* | 12/2011 | Deng .................. H04L 63/0407 713/159 |
| 2012/0078693 A1 | 3/2012 | Wilkes |
| 2012/0101886 A1 | 4/2012 | Subramanian et al. |
| 2012/0123924 A1 | 5/2012 | Rose et al. |
| 2012/0185395 A1 | 7/2012 | Wilkes |
| 2012/0239543 A1 | 9/2012 | Ryan |
| 2012/0278200 A1 | 11/2012 | van Coppenolle et al. |
| 2013/0036373 A1 | 2/2013 | Alderfer et al. |
| 2013/0041773 A1 | 2/2013 | Muse |
| 2013/0054471 A1 | 2/2013 | Samid |
| 2013/0061049 A1 | 3/2013 | Irvine |
| 2013/0159699 A1 | 6/2013 | Torkkel |
| 2013/0166455 A1 | 6/2013 | Feigelson |
| 2013/0191277 A1 | 7/2013 | O'Leary et al. |
| 2013/0232023 A2 | 9/2013 | Muse |
| 2013/0238478 A1 | 9/2013 | Bruno |
| 2013/0246233 A1 | 9/2013 | Hakim |
| 2013/0254052 A1 | 9/2013 | Royyuru et al. |
| 2013/0311266 A1 | 11/2013 | Vichich et al. |
| 2013/0311348 A1 | 11/2013 | Samid |
| 2013/0317972 A1 | 11/2013 | Morgenstern et al. |
| 2013/0317984 A1 | 11/2013 | O'Leary et al. |
| 2013/0325701 A1 | 12/2013 | Schwartz |
| 2014/0025473 A1 | 1/2014 | Cohen |
| 2014/0032267 A1 | 1/2014 | Smith et al. |
| 2014/0040157 A1 | 2/2014 | Cohen et al. |
| 2014/0081710 A1 | 3/2014 | Rabie |
| 2014/0122903 A1 | 5/2014 | Endo et al. |
| 2014/0141869 A1 | 5/2014 | Shore |
| 2014/0156497 A1 | 6/2014 | Mehew et al. |
| 2014/0164251 A1 | 6/2014 | Loh |
| 2014/0233740 A1 | 8/2014 | Niamut et al. |
| 2014/0310527 A1 | 10/2014 | Veugen et al. |
| 2014/0344015 A1 | 11/2014 | Puertolas-Montanes et al. |
| 2014/0379428 A1 | 12/2014 | Phansalkar et al. |
| 2015/0033301 A1 | 1/2015 | Pianese |
| 2015/0120567 A1 | 4/2015 | Van Rooyen et al. |
| 2015/0120569 A1 | 4/2015 | Belshe |
| 2015/0170112 A1 | 6/2015 | DeCastro |
| 2015/0188906 A1 | 7/2015 | Minov et al. |
| 2015/0193744 A1 | 7/2015 | Adleman |
| 2015/0227897 A1 | 8/2015 | Loera |
| 2015/0244690 A1 | 8/2015 | Mossbarger |
| 2015/0262137 A1 | 9/2015 | Armstrong |
| 2015/0262138 A1 | 9/2015 | Hudon |
| 2015/0262139 A1 | 9/2015 | Shtylman |
| 2015/0262140 A1 | 9/2015 | Armstrong |
| 2015/0262141 A1 | 9/2015 | Rebernik |
| 2015/0262168 A1 | 9/2015 | Armstrong |
| 2015/0262171 A1 | 9/2015 | Langschaedel |
| 2015/0262172 A1 | 9/2015 | Rebernik |
| 2015/0262173 A1 | 9/2015 | Durbin et al. |
| 2015/0262176 A1 | 9/2015 | Langschaedel |
| 2015/0296379 A1 | 10/2015 | Nix |
| 2015/0310424 A1 | 10/2015 | Myers |
| 2015/0324787 A1 | 11/2015 | Schaffner |
| 2015/0332283 A1 | 11/2015 | Witchey |
| 2015/0341422 A1 | 11/2015 | Farnlof et al. |
| 2015/0348169 A1 | 12/2015 | Harris |
| 2015/0356523 A1 | 12/2015 | Madden |
| 2015/0356555 A1 | 12/2015 | Pennanen |

(56) References Cited

U.S. PATENT DOCUMENTS

| | | |
|---|---|---|
| 2015/0363777 A1 | 12/2015 | Ronca et al. |
| 2015/0363783 A1 | 12/2015 | Ronca et al. |
| 2015/0379510 A1 | 12/2015 | Smith |
| 2016/0027229 A1 | 1/2016 | Spanos et al. |
| 2016/0028552 A1 | 1/2016 | Spanos et al. |
| 2016/0078219 A1 | 3/2016 | Hernan |
| 2016/0080156 A1 | 3/2016 | Kaliski, Jr. et al. |
| 2016/0086187 A1 | 3/2016 | Joao |
| 2016/0092988 A1 | 3/2016 | L etourneau |
| 2016/0112200 A1 | 4/2016 | Kheterpal et al. |
| 2016/0125040 A1 | 5/2016 | Kheterpal et al. |
| 2016/0134616 A1 | 5/2016 | Koushik et al. |
| 2016/0162873 A1 | 6/2016 | Zhou |
| 2016/0164678 A1 | 6/2016 | Nix |
| 2016/0203448 A1 | 7/2016 | Metnick |
| 2016/0269386 A1 | 9/2016 | Nix |
| 2017/0005804 A1 | 1/2017 | Zinder |
| 2017/0017955 A1 | 1/2017 | Stern |
| 2017/0091750 A1 | 3/2017 | Maim |
| 2017/0124535 A1 | 5/2017 | Juels |
| 2017/0132630 A1 | 5/2017 | Castinado |
| 2017/0188231 A1 | 6/2017 | Nix |
| 2017/0237561 A1 | 8/2017 | Nix |
| 2017/0302447 A1 | 10/2017 | Nix |
| 2017/0373845 A1 | 12/2017 | Nix |

FOREIGN PATENT DOCUMENTS

| | | |
|---|---|---|
| EP | 2634738 A1 | 4/2013 |
| WO | WO 00/26745 | 5/2000 |
| WO | WO2000026745 A2 | 5/2000 |
| WO | WO 01/67409 | 9/2001 |
| WO | WO 01/86373 | 11/2001 |
| WO | WO 2008/127428 | 10/2008 |
| WO | WO2011008630 | 1/2011 |
| WO | 2016-015041 | 1/2012 |
| WO | WO2013034278 A2 | 3/2013 |
| WO | WO 2015/059669 | 4/2015 |
| WO | WO 2015/085393 | 6/2015 |
| WO | WO 2015/113519 | 8/2015 |
| WO | WO 2015/179020 | 11/2015 |
| WO | WO 2016/088659 | 1/2016 |
| WO | WO 2016/022864 | 2/2016 |
| WO | WO 2016/029119 | 2/2016 |

OTHER PUBLICATIONS

Notice of References Cited, U.S. Appl. No. 12/192,809 (dated Oct. 10, 2012).
Online auctions: An in-depth look, National Consumers League, http://www.nclnet.org/personal-finance/121-online-auctions/279online-auctions-an-in-depth-look (last visited May 30, 2014).
PPCoin Proof of Stake Minting Setup Guide, Bitcoin Forum (Apr. 25, 2013) https://bitcointalk.org/index.php?topic=187714.0 (last visited Jul. 22, 2013).
PPCoin, Wikipedia, http://en.wikipedia.org/wiki/PPCoin (last visited Jul. 22, 2013).
Private Bitcoin Insurance, Inscrypto, http://go.inscrypto.com (last visited Jan. 24, 2014).
Proof-of-stake, Wikipedia, http://en.wikipedia.org/wiki/Proof-of-stake (last visited Jul. 22, 2013).
Proof-of-work System, Wikipedia, http://en.wikipedia.org/wiki/Proof-of-work (last visited Jul. 22, 2013).
Protocol of Bitcoin, Wikipedia, http://en.wikipedia.org/wiki/Bitcoin_mining (last visited Jul. 22, 2013).
Rachel Abrams, Winklevoss Twins to List Bitcoin Fund on Nasdaq, The New York Times DealB%k, http://dealbook.nytimes.com/2014/05/08/winklevoss-twins-to-list-bitcoin-fund-on-nasdaq/ (last visited May 8, 2014).
Rob Wile, Shares Of No-Name Tech Company Go Crazy After It Announces It's Getting Into The Bitcoin Game, Business Insider, http://www.businessinsider.com/wpcs-bitcoin-2013-12?hr_email_referer=1&utm_source=Triggermail&utm_medium=email&utm_content=emailshare (last visited Dec. 30, 2013).
Satoshi Nakamoto, Bitcoin: A Peer-to-Peer Electronic Cash System (Oct. 31, 2008).
Securing Your Wallet, Bitcoin.org (Jul. 21, 2013) Internet Archive, http://web.archive.org/web/20130721194621/http://bitcoin.org/en/secure-your-wallet.
Security for Your Peace of Mind, Coinbase, https://coinbase.com/security (last visited Oct. 28, 2013).
Shamir's Secret Sharing, Wikipedia, http://en.wikipedia.org/wiki/Shamir's_Secret_Sharing (last visited Jul. 22, 2013).
Some Things You Need To Know, Bitcoin.org (May 2, 2013) Internet Archive, http://web.archive.org/web/20130502051011/http://bitcoin.org/en/you-need-to-know.
Stephen Foley & Alice Ross, Bitcoin bubble grows and grows, Financial Times, http://www.ft.com/intl/cms/s/0/obe7d8e-9c73-11e2-9a4b-00144feabdc0/html (last visited Oct. 30, 2013).
Sunny King & Scott Nadal, PPCoin: Peer-to-Peer Crypto-Currency with Proof-of-Stake, (Aug. 19, 2012).
TigerDirect.com Now Accepts Bitcoin Payments!, TigerDirect, http://www.tigerdirect.com/bitcoin/ (last visited Feb. 6, 2014).
U.S. Appl. No. 60/884,172, filed Jan. 9, 2007.
U.S. Appl. No. 61/225,256, filed Jul. 14, 2009.
USD Average Price History, BitcoinAverage, https://bitcoinaverage.com/charts.htm@USD-averages-all (last visited Feb. 24, 2014).
Using Offline Wallets in Armory, Armory (May 20, 2013) Internet Archive, http://web.archive.org/web/20130520100213/https://bitcoinarmory.com/using-offline-wallets-in-armory/.
Victoria Turk, Bitcoin 'Banks' Are Trying to Rebrand Cryptocurrencies for the Mainstream, Motherboard, http://motherboard.vice.com/en_ca/read/bitcoin-banks-try-to-rebrand-cryptocurrencies-for-the-mainstream (last visited May 5, 2014).
Why Bitcoin Is Changing The World, Bitcoin.org (Jun. 20, 2013) Internet Archive, http://web.archive.org/web/20130620062218/http://bitcoin.org/en/innovation.
Winklevoss Bitcoin Trust Amendment No. 3 to Form S-1 Registration Statement, SEC (May 8, 2014), available at http://www.sec.gov/Archives/edgar/data/1579346/000119312514190365/d721187ds1a.htm.
World Gold Council, How SPDR Gold Shares (2840 HK) are Created and Redeemed (Mar. 2013).
Bitcoin, A Primer for Policymakers(2013).
Bitcoin: a first assessment, FX and Rates | Global, Bank of America Merrill Lynch (Dec. 5, 2013).
Bitcoin: Questions, Answers, and Analysis of Legal Issues, Congressional Research Service (Dec. 20, 2013).
The audacity of bitcoin, Risks and opportunities for corporates and investors,Global Rates & FX Research, J.P. Morgan (Feb. 11, 2014), http://www.jpmorganmarkets.com/GlobalFXStrategy.
John Heggestuen, BITCOIN: How It Works, And How It Could Fundamentally Change How Companies And Individuals Handle Payments, BI Intelligence (Jan. 30, 2014).
Bitcoin: Intrinsic Value as Conduit for Disruptive Payment Network Technology, Wedbush, Computer Services: Financial Technology (Dec. 1, 2014).
Digitizing Trust: Leveraging the Bitcoin Protocol Beyond the "Coin", Wedbush, Computer Services: Financial Technology (Jan. 2, 2014).
Bitcoin: Watch the Innovation, Not the Price, Wedbush, Computer Services: Financial Technology (Feb. 14, 2014).
"How Bitcoin is Driving Digital Innovation in Entertainment, Mediaand Communications (EMC), PwC Consumer Intelligence Series, Digital Disruptor, (Jan. 27, 2014)."
Bitcoins and Banks: Problematic currency, interesting payment system, UBS, Global Research (Mar. 28, 2014).
François R. Velde, Bitcoin: A primer, The Federal Reserve Bank of Chicago, Chicago Fed Letter (Dec. 2013).
David Andolfatto, Bitcoin and Beyond: The Possibilities and Pitfalls of Virtual Currencies, Federal Reserve Bank of St. Louis, Dialogue With the Fed, Beyond Today's Financial Headlines (Mar. 31, 2014).
All About Bitcoin, Goldman Sachs, Global Macro Research, Top of Mind, Issue 21 (Mar. 11, 2014).

(56) References Cited

OTHER PUBLICATIONS

Julieta Duek and Demian Brener, Bitcoin: Understanding and Assessing potential Opportunities, Quasar Ventures, (Jan. 2014).
"Yacine Ghalim and Max Niederhofer, bitcoin: Primer, State of Play, Discussion, Courmayeur, Sunstone Capital (Jan. 24, 2014)."
Timing and Sizing the Era of Bitcoin, Wedbush, Computer Services: Financial Technology (May 27, 2014).
State of Bitcoin 2014, CoinDesk (Feb. 26, 2014).
Ronald A. Glantz, Pantera Primer, (Mar. 11, 2014).
Anton Badev and Matthew Chen, Bitcoin: Technical Background and Data Analysis, Finance and Economics Discussion Series, Divisions of Research & Statistics and Monetary Affairs, Federal Reserve Board, Washington, D.C. (Oct. 7, 2014).
Bitcoin Moves Closer to Regulation, Straffor Flobal Intelligence (Jan. 29, 2015), https://www.straffor.com/sample/analysis/bitcoin-moves-closer-regulation#axzz/ (last visited Jan. 30, 2015).
BLOCKTRAIL|Bitcoin Block Explorer, Blocktrail (Aug. 18, 2014), https://www.blocktrail.com/.
Jerry Bito and Andrea Castillo, BITCOIN A Primer for Policymakers, Mercatus Center, George Mason University (2013).
Daniel Palmer, Coinfloor Plans Europe's First Bitcoin ETF, Adds USD Support, CoinDesk (Oct. 21, 2014), http://www.coindesk.com/coinfloor-launch-bitcoin-trading-fund-adds-new-currencies/ (last visited Oct. 22, 2014).
[ANN] M-of-N "Fragmented Backups" now in Armory (command-line only), Bitcoin Forum (Mar. 6, 2013), https://bitcointalk.org/index.php?topic=149820.0 (last visited Dec. 4, 2013).
2-of-3 Paper Wallets, Bitcoin Forum (published Jan. 29, 2013), https://bitcointalk.org/index.php?topic=139625.msg1487254 (last visited Dec. 4, 2013).
A Physical Price Tag For A Digital Currency. Introducing Bittag., BitTag, http://bittag.net/ (last visited Feb. 5, 2014).
A powerful trading platform for Bitcoin traders, BTXTrader.com (Aug. 13, 2013) Internet Archive, https://web.archive.org/web/20130813052513/http://www.btxtrader.com/.
About Bitcoin, Bitcoin.org (May 2, 2013) Internet Archive, http://web.archive.org/web/20130502214154/http://bitcoin.org/en/about.
An Open Source P2P Digital Currency, Bitcoin.org, http://bitcoin.org/en/ (last visited Jul. 22, 2013).
Ashlee Vance & Brad Stone, The Bitcoin-Mining Arms Race Heats Up, BloombergBusinessweek, http://www.businessweek.com/articles/2014-01-09/bitcoin-mining-chips-gear-computing-groups-competition-heats-up (last visited Jan. 9, 2014).
Bitcoin Fund Exclusively Available On EXANTE's Platform, EXANTE, https://exante.eu/press/news/266/ (last visited Oct. 10, 2013).
Bitcoin Now on Bloomberg, Bloomberg Now (Apr. 30, 2014) Internet Archive, https://web.archive.org/web/20140430184511/http://www.bloomberg.com/now/2014-04-30/bitcoin-now-bloomberg/.
Bitcoin Theft Insurance, Ecoin Club (published Dec. 3, 2013), http://ecoinclub.com/bitcoin-insurance/ (last visited Dec. 5, 2013).
Bitcoin, Wikipedia (Jun. 24, 2013), Internet Archive http://web.archive.org/web/20130624030646/http://en.wikipedia.org/wiki/Bitcoin.
Bitcoinaverage code repository, GitHub, https://github.com/bitcoinaverage/bitcoinaverage/commits/master?page=134 (last visited Feb. 24, 2014).
BitcoinAverage.com—independent bitcoin price, Bitcoin Forum, https://bitcointalk.org/index.php?topic=270190.0 (last visited Feb. 24, 2014).
BitcoinAverage.com, Reddit, http://www.reddit.com/r/Bitcoin/comments/1jl9c2/ (last visited Feb. 24, 2014).
Bitcoin's First Kiosk, Robocoin (Jul. 2, 2013) Internet Archive, https://web.archive.org/web/20130702171110/https://robocoinkiosk.com/.
Bitcoin's First Real ATM, Robocoin Blog, http://blog.robocoinkiosk.com/ (last visited Nov. 11, 2013).
Bitflash Weekly Review (Apr. 14, 2014), Pantera, https://panteracapital.com/bitflash/ (last visited Apr. 15, 2014).

Bob Sullivan, 'Deadbeat bidders' dog eBay sellers, NBCNews.com (published Sep. 5, 2002), http://www.nbcnews.com/id/3078738/ns/technology_and_sciencetech_and_gadgets/t/deadbeat-bidders-dog-ebay-sellers/#.U4inz_IdXuS (last visited May 30, 2014).
Brian Cohen, JPMorgan Chase Building Bitcoin-Killer, Lets Talk Bitcoin (published Dec. 9, 2013) http://letstalkbitcoin.com/jpmorgan-chase-building-bitcoin-killer/ (last visited Dec. 10, 2013).
Buying and Selling Linden Dollars, Second Life, http://community.secondlife.com/t5/English-Knowledge-Base/Buying-and-selling-Linden-dollars/ta-p/700107 (last visited Dec. 9, 2013).
Charts' Bitcoin Charts (May 10, 2013) Internet Archive, https://web.archive.org/web/20130510172057/http://bitcoincharts.com/charts/.
Choose Your Wallet, Bitcoin.org (May 30, 2013) Internet Archive, http://web.archive.org/web/20130530072551/http://bitcoin.org/en/choose-your-wallet.
Circle (May 19, 2014) Internet Archive, https://web.archive.org/web/20140519175717/https://www.circle.com/.
Coinbase, Bitcoin Wallet (Jul. 22, 2013) Internet Archive, http://web.archive.org/web/20130722200359/https://coinbase.com/.
Coinbase, Bitcoin Wallet, https://coinbase.com/ (last visited Aug. 15, 2013).
CoinDesk Bitcoin Price Index, CoinDesk, http://www.coindesk.com/price/ (last visited Oct. 23, 2013).
CoinDesk, This week we released the first version of our mobile app on iPhone, Twitter (published May 2, 2014), https://twitter.com/coindesk/status/462255287177453568?refsrc=email (last visited May 5, 2014).
Durnford, Barter network aims to help Mile End's cash-strapped live well, The Gazette [Montreal, Que] (Jan. 23, 1996).
Electrum, Bitcoin wiki, https://en.bitcoin.it/wiki/Electrum (last visited Jul. 22, 2013).
Elliptic Vault: Secure, Worry-free Storage For Your Bitcoins, Elliptic.co (Jan. 12, 2014) Internet Archive, https://web.archive.org/web/20140112043128/https://www.elliptic.co/vault.
FAQ: What's The Difference Between PPCoin and Bitcoin?, GitHub, https://github.com/ppcoin/ppcoin/wiki/FAQ (last visited Jul. 22, 2013).
First Bitcoin Capital Corp.(otc markets:BITCF) Launches Digital Currency Exchange, CoinQX.com in Beta, The Wall Street Journal MarketWatch, http://www.marketwatch.com/story/first-bitcoin-capital-corpotc-markets-bitcf-launches-digital-cunency-exchange-coinqxcom-in-beta-2014-05-21 (last visited May 21, 2014).
How Bitcoin Works Under The Hood, Imponderable Things (Scott Driscoll's Blog) (published Jul. 14, 2013), http://www.imponderablethings.com/2013/07/how-bitcoin-works-under-hood.html (last visited Oct. 10, 2013).
How DigiCash Blew Everything, NEXT (published Jan. 1999), http://cryptome.org/jya/digicrash.htm (last visited Jan. 9, 2014).
How Does Bitcoin Work?, Bitcoin.org, (May 1, 2013) Internet Archive, http://web.archive.org/web/20130501092121/http://bitcoin.org/en/how-it-works.
How is Mt.Gox weighted average calculated?, Bitcoin Forum (Mar. 18, 2013), https://bitcointalk.org/index.php?topic=154548.0 (last visited Jul. 25, 2013).
Ina Steiner, eBay Mulls New Feature to Eliminate Deadbeat Bidders, EcommerceBytes Blog (published May 12, 2012), http://www.ecommercebytes.com/C/blog/blog.p1Wp1/2012/5/1336831866.html (last visited May 30, 2014).
Independent Bitcoin Price, BitcoinAverage, https://bitcoinaverage.com/explain.htm (last visited Mar. 4, 2014).
Introducing BDIC: Bitcoin's decentralized, privately-funded version of the FDIC, Reddit (published Dec. 4, 2013), http://www.reddit.com/r/Bitcoin/comments/1s365o/introducing_bdic_bitcoins_decentralized/ (last visited Dec. 5, 2013).
James Ball, Meet the seven people who hold the keys to worldwide internet security, The Guardian, http://www.theguardian.com/technology/2014/feb/28/seven-people-keys-worldwide-internet-security-web (last visited Mar. 7, 2014).
Jeremy Allaire, What We Have Been Up to at Circle, The Circle Blog (May 19, 2014) Internet Archive, https://web.archive.org/web/20140519162958/https://www.circle.com/2014/05/15/circle-update/.

(56) References Cited

OTHER PUBLICATIONS

Joe Adler, Bitcoin Backers Seek FDIC-Style Insurance, American Banker (Jan. 22, 2014), http://www.americanbanker.com/issues/179_15/bitcoin-backers-seek-fdic-style-insurance-1065089-1.html?zkPrintable=true.
John Biggs, Xapo Raises $20 Million To Bury Your Bitcoin Underground, TechCrunch (Mar. 14, 2014) Internet Archive, https://web.archive.org/web/20140314042301/http://techcrunch.com/2014/03/13/xapo-raises-20-million-to-bury-your-bitcoin-underground/.
Jon Matonis, CoinDesk Launches Proprietary Bitcoin Price Index, CoinDesk (published Sep. 11, 2013), http://www.coindesk.com/coindesk-launches-proprietary-bitcoin-price-index/ (last visited Oct. 30, 2013).
Jon Southurst, ATM Industry Association Publishes Report on Bitcoin ATMs, CoinDesk (published Mar. 20, 2014), http://www.coindesk.com/atm-industry-association-publishes-report-bitcoin-atms/ (last visited Mar. 21, 2014).
Jonathan Shieber, Circle Emerges From Stealth To Bring Bitcoin To The Masses, TechCrunch (May 18, 2014) Internet Archive, https://web.archive.org/web/20140518130248/http://techcrunch.com/2014/05/15/circle-emerges-from-stealth-to-bring-bitcoin-to-the-masses/.
Larry Ren, Proof of Stake Velocity: Building the Social Currency of the Digital Age, www.reddcoin.com (Apr. 2014).
Lisa Fleisher, London's New Bitcoin Exchange Hopes to Avoid Mt. Gox Fate, The Wall Street Journal (published Apr. 30, 2014), http://blogs.wsj.com/digits/2014/04/30/londons-new-bitcoin-exchange-hopes-to-avoid-mt-gox-fate/ (last visited May 1, 2014).
Markets API, Bitcoin Charts (Jun. 3, 2013) Internet Archive, https://web.archive.org/web/20130603091557/http://bitcoincharts.com/about/markets-api.
Max Raskin, Cameron and Tyler Winklevoss on Bitcoin and Their Public Persona, BloombergBusinessweek, http://www.businessweek.com/articles/2013-08-08/cameron-and-tyler-winklevoss-on-bitcoin-and-their-public-persona (last visited Aug. 8, 2013).
U.S. Appl. No. 61/954,434, filed Mar. 17, 2014.
U.S. Appl. No. 61/990,017, filed May 7, 2014.
U.S. Appl. No. 62/042,676, filed Aug. 27, 2014.
U.S. Appl. No. 62/056,100, filed Sep. 26, 2014.
U.S. Appl. No. 62/086,669, filed Dec. 2, 2014.
U.S. Appl. No. 62/099,992, filed Jan. 15, 2015.
David Harper, Exploring the Exponentially Weighted Moving Average, Investopedia (Mar. 18, 2007) Internet Archive, https://web.archive.org/web/20070318160651/http://www.investopedia.com/articles/07/EWMA.asp.
Ken Hawkins, Exchange-Traded Funds (ETFs), Investopedia (May 12, 2013) Internet archive, https://web.archive.org/web/20130512125447/http://www.investopedia.com/university/exchange-traded-fund/.
Proof of stake instead of proof of work, Bitcoin Forum, https://bitcointalk.org/index.php?topic=27787 (last visited Nov. 3, 2015).
Trading Namecoins for Bitcoins, Bitcoin Forum, https://bitcointalk.org/index.php?topic=6289.0 (last visited Nov. 6, 2015).
International Search Report and Written Opinion issued in Application No. PCT/US16/25189 dated Jul. 1, 2016 (15 pp.).
"Digital Currency Exchange Goes Live to Public in Melbourne, Australia," AlphaPoint, https://globenewswire.com/news-release/2015/12/10/794524/0/en/Digital-Currency-Exchange-Goes-Live-to-Public-in-Melbourne-Australia.html, Dec. 10, 2015, 3 pages.
"Nasdaq Linq Enables First-Ever Private Securities Issuance Documented with Blockchain Technology," Nasdaq, https://globenewswire.com/news-release/2015/12/30/798660/0/en/Nasdaq-Linq-Enables-First-Ever-Private-Securities-Issuance-Documented-With-Blockchain-Technology.html, Dec. 30, 2015, 3 pages.
International Search Report and Written Opinion issued in Application No. PCT/US16/040711 dated Oct. 4, 2016 (14 pages).
"Blockchain Technologies Corp Makes History, 2016 Iowa Caucus Results Forever Documented on Blockchain", https://globenewswire.com/news-release/2016/02/06/808320/10159855/en/Blockchain-Technologies-Corp-Makes-History-2016-Iowa-Caucus-Results-Forever-Documented-on-Blockchain.html, Feb. 5, 2016, 2 pages.

"AlphaPoint Announces Blockchain Solution Custom-Built for Financial Institutions," AlphaPoint, https://globenewswire.com/news-release/2015/10/26/779929/0/en/AlphaPoint-Announces-Blockchain-Solution-Custom-Built-for-Financial-Institutions.html, Oct. 26, 2015, 3 pages.
"Nasdaq Launches Enterprise-Wide Blockchain Technology Initiative", Nasdaq, https://globenewswire.com/news-release/2015/05/11/734456/10133665/en/Nasdaq-Launches-Enterprise-Wide-Blockchain-Technology-Initiative.html, May 11, 2015, 3 pages.
"RR Donnelley to Pursue New Blockchain-Enabled Capabilities for Publishing Industry," https://globenewswire.com/news-release/2016/03/14/819355/0/en/RR-Donnelley-to-Pursue-New-Blockchain-Enabled-Capabilities-for-Publishing-Industry.html, Mar. 14, 2016, 3 pages.
Daniel Cawrey, Eschewing Price, Pantera Launches BitIndex to Track Bitcoin, CoinDesk (Jul. 10, 2014), http://www.coindesk.com/eschewing-price-pantera-launches-bitindex-track-bitcoin/ (last visited Jul. 11, 2014).
"Coinsetter Launches Out of Beta, Platform Now a Full U.S.Bitcoin Exchange, Coinsetter blog (Jul. 24, 2014), http://www.coinsetter.com/blog/2014/07/24/coinsetter-launches-beta-platform-now-full-us-bitcoin-exchange/ (last visited Jul. 24, 2014)."
Request for Administrative Ruling on the Application of FinCEN's Regulations to a Virtual Currency Trading Platform, United States Department of the Treasury, FinCEN, (Oct. 27, 2014).
Request for Administrative Ruling on the Application of FinCEN's Regulations to a Virtual Currency Payment System, United States Department of the Treasury, FinCEN, (Oct. 27, 2014).
Daniel Roberts, On Winklevoss Bitcoin index, it's open season for developers, FORTUNE, (Jul. 22, 2014).
Evan L. Greebel et al., Recent Key Bitcoin and Virtual Currency Regulatory and Law Enforcement Developments, Virtual Currency Advisory, Katten Muchin Rosenman LLP (Nov. 13, 2014).
BTC, Google Finance, https://www.google.com/finance?q=CURRENCY%3ABTC&ei=T-euU7jVFZOUwQPNkIHYCQ (last visited Jul. 11, 2014).
Sanjay Panikkar et al., ADEPT: An IoT Practitioner Perspective, IBM (2015).
Bitcoins the hard way: Using the raw Bitcoin protocol, Ken Shirriff's blog, (Feb. 3, 2014) Internet Archive, https://web.archive.org/web/20140203192446/http://www.righto.com/2014/02/bitcoins-hard-way-using-raw-bitcoin.html.
NYC Bitcoin Exchange Coinsetter Launches Out of Beta With Institutional and Consumer Trading, MarketWatch (published Jul. 24, 2014), http://www.marketwatch.com/story/nyc-bitcoin-exchange-coinsetter-launches-out-of-beta-with-institutional-and-consumer-trading-2014-07-24 (last visited Jul. 24, 2014).
Major Bitcoin Investment Firm Launches Bitindex, The Crypto Crimson, (published Jul. 10, 2014), http://cryptocrimson.com/2014/07/major-bitcoin-investment-tirm-launches-bitindex/ (last visited Jul. 11, 2014).
"We make it easy to build secure, high-level services on topof the Bitcoin protocol, Trusted Coin (Dec. 26, 2013) Internet Archive, https://web.archive.org/web/20131226232433lhttps://api.trustedcoin.com/f."
WINKBTCO Index, Bloomberg Finance L.P. (Jun. 16, 2014).
"What Is Blockchain Technology?" Quora. N.p. Jan. 15, 2009. Web. Jun. 9, 2017. <https://www.quora.com/What-is-blockchain-technology-1>.
The Ripple Network Review—What Is Ripple?, Donald McIntyre— Etherplan (Aug. 1, 2013) https://etherplan.com/2013/08/01/the-ripple-network-review-what-is-ripple/4103/, Internet.
ATMIA ATM Industry Association Position Paper, www.atmia.com, Internet.
Winklevosses' Gemini to Offer Cryptocurrency Block Trading, Olga Kharif and Matthew Leising, Bloomberg.com (Apr. 9, 2018) https://www.bloomberg.com/news/articles/2018-04-09/winklevoss-s-gemini-to-offer-cryptocurrency-block-trading, Internet.
A block chain based decentralized exchange, Harsh Patel.
Marketplace—Gemini, web.archive.org (Last modified Jan. 8, 2018) http://web.archive.org/web/20180125115941/https://gemini.com/marketplace/, Internet.

(56) References Cited

OTHER PUBLICATIONS

Marketplace—Gemini, web.archive.org (Last modified Nov. 25, 2017) http://web.archive.org/web/20171211092415/https://gemini.com/marketplace/, Internet.

Marketplace, Gemini.com (Last modified Sep. 20, 2018) https://gemini.com/marketplace/, Internet.

BANKEX Proof-of-Asset Protocol—The Smart White Paper, version 0.3.1 beta (Oct. 19, 2017) 36 pgs.

World Bank taps Australia's CBA for blockchain bond, Reuters, FINTECH (Aug. 9, 2018) 3 pgs.

\* cited by examiner

AUTONOMOUS DEVICES

CROSS-REFERENCE TO RELATED APPLICATIONS

This application is a continuation of and claims the benefit of and priority to U.S. Non-Provisional patent application Ser. No. 15/071,902, filed Mar. 16, 2018 and entitled AUTONOMOUS DEVICES, which in turn claims the benefit of and priority to U.S. Provisional Patent Application Ser. No. 62/133,978, filed Mar. 16, 2015, the contents of these applications being incorporated herein by reference in their entirety as if fully set forth herein.

FIELD OF THE INVENTION

The present invention generally relates to autonomous devices and systems, methods, and program products for authorizing and performing transactions by autonomous devices.

BACKGROUND OF THE INVENTION

Autonomous devices and the internet of things are becoming an important part of the marketplace. Networked computers are increasingly being integrated into devices that previously required human operation, management, and/or oversight. Networked appliances and autonomous vehicles are under development. Inventors contemplate a wide range of autonomous devices that may be available with the new internet of things. Inventors further recognize that there is a growing need to enable such devices to engage in transactions and for computer equipment to address the technological challenges associated with such transactions. For example, inventors envision, by way of example, laundromat washing machines may accept payment, such as digital payment. Refrigerators may order groceries according to a predefined schedule and/or upon determining that certain supplies are low. Autonomous vehicles, drones, and/or self-driving cars may pay tolls and/or pay for fuel. Technical solutions, including new computer systems and software solutions, are required to enable autonomous devices to engage in transactions securely, such as to avoid fraudulent transactions, to protect against unauthorized transactions from intercepted or otherwise tampered with drones, and/or to confirm a device owner's authorization for the transactions. Technical solutions are further required to verify identities of the autonomous devices and/or their owners, administrators, and/or operators. Such identities may be required to comply with identity-based regulations for financial transactions.

The present invention provides solutions to these needs.

SUMMARY OF THE INVENTION

In embodiments, an autonomous device can comprise one or more processors and non-transitory computer-readable memory operatively connected to the one or more processors and having stored thereon computer-readable instructions to perform the steps of generating, by the autonomous device, a first hash value of a chain of hash values by applying a hash algorithm to first data including first new data and a first previous hash value of the chain of hash values, the first previous hash value computed by applying the hash algorithm to first previous data; transmitting, from the autonomous device to a digital asset transaction computer system, the first hash value and the first new data; generating, by the autonomous device, a first signed electronic transaction request comprising (1) first transaction data comprising a sending account identifier associated with the first autonomous device, a destination account identifier, a transaction amount, and a timestamp, and (2) a first autonomous device digital signature generated using a first private key of a first autonomous device asymmetric key pair; and transmitting, from the autonomous device to the digital asset transaction computer system, the first signed electronic transaction request.

In embodiments, the first new data can comprise at least a portion of the first signed electronic transaction request. In embodiments, the first new data can comprise a timestamp. In embodiments, the first new data can comprise position data associated with a location of the autonomous device.

In embodiments, the first hash value may be generated and transmitted according to a periodic schedule for the chain of hash values.

The embodiments, the autonomous device may be further configured to perform the steps of receiving, at the autonomous device from a destination device associated with the destination account identifier, a signed electronic offer comprising the destination account identifier, the transaction amount, and a destination device digital signature generated using a second private key of a destination device asymmetric key pair, and providing, from the autonomous device to the digital asset transaction computer system, the signed electronic offer.

In embodiments, a digital asset transaction computer system may receive from a first autonomous device a first signed electronic transaction request. The first signed electronic transaction request may comprise first transaction data, which may comprise a sending account identifier associated with the first autonomous device, a destination account identifier, a transaction amount, and a timestamp. The first transaction data may further comprise a first autonomous device digital signature generated using a first private key of a first autonomous device asymmetric key pair to encrypt the first transaction data.

The digital asset transaction computer system may receive from the first autonomous device a first hash value in a chain of hash values, wherein the first hash value was computed by applying a hash algorithm to first data including first new data and a first previous hash value in the chain of hash values, the first previous hash value computed by applying the hash algorithm to first previous data not including the first new data.

The digital asset transaction computer system may authenticate the first signed electronic transaction request by (1) verifying the first autonomous device digital signature by decrypting, using a first public key of the first autonomous device asymmetric key pair, the encrypted first transaction data, and verifying that the decrypted first transaction data equals the received first transaction data, and (2) performing fraud detection to evaluate authenticity of the first autonomous device by accessing a first stored previous hash value stored in association with the first autonomous device in non-transitory computer-readable memory operatively connected to the digital asset transaction computer system, wherein the first stored previous hash value is a stored copy of the previous hash value, computing a verification hash value by applying the hash algorithm to the first new data and the first stored previous hash value, and verifying that the verification hash value equals the first hash value to determine that no other hash values have been received, either from the first autonomous device or from a second device posing as the first autonomous device, between receipt of the first previous hash value and receipt of the first hash value.

The digital asset transaction computer system may determine authorization to execute a first transaction according to the first signed electronic transaction request by identifying a first account associated with the first autonomous device, retrieving, from a first database, first transaction rules governing the allowable transactions associated with the first account, and evaluating the first transaction rules at least with respect to the first transaction data. The digital asset transaction computer system may the execute the first transaction.

In embodiments, the first account may be a first sub-account subordinate to a master digital asset account.

In embodiments, the first transaction rules may be unique to the first sub-account. The first transaction rules may be associated with the master account and apply to a plurality of sub-accounts subordinate to the master account including the first sub-account.

In embodiments, the first hash value is received along with the first signed electronic transaction request. In embodiments, the first hash value may be received as part of a periodic transmission of hash values of the chain of hash values from the first autonomous device.

In embodiments, the first data may comprise at least a portion of the first signed electronic transaction request.

In embodiments, the digital asset transaction computer system may transmit to an electronic address associated with the destination account identifier an electronic indication of an identity associated with the first autonomous device. In embodiments, the electronic indication of the identity associated with the first autonomous device may comprise an identification of the owner of the master account.

In embodiments, executing the first transaction may comprise transmitting, by the digital asset transaction computer system to a digital asset network, an electronic indication of the executed transaction for inclusion in a distributed public electronic ledger that records digital asset transactions among nodes in the digital asset network.

In embodiments, the digital asset transaction computer system may transmit to a destination autonomous device associated with the destination account identifier an electronic indication of the executed transaction.

In embodiments, the digital asset transaction computer system may receive from a second device a second signed electronic transaction request comprising (1) second transaction data comprising the sending account identifier associated with the first autonomous device, a second destination account identifier, a second transaction amount, and a second timestamp, and (2) an apparent autonomous device digital signature generated using the first private key of the first autonomous device asymmetric key pair. The digital asset transaction computer system may receive from the second device, a second hash value and second new data and verify the validity of the second signed electronic transaction request by (1) verifying using the first public key of the first autonomous device asymmetric key pair, the apparent autonomous device digital signature, and (2) evaluating the authenticity of the second device by accessing a second stored previous hash value stored in association with the first autonomous device in the non-transitory computer-readable memory, computing a second verification hash value by applying the hash algorithm to the second new data and the second stored previous hash value, and determining that the second verification hash value does not equal the second hash value. The digital asset transaction computer system may reject the second signed electronic transaction request. The digital asset transaction computer system may store a warning indicator to reject future transaction requests apparently received from the first autonomous device.

In embodiments, the digital asset transaction computer system may, prior to executing the first transaction, receive a signed electronic offer comprising the destination account identifier, the transaction amount, and a destination device digital signature generated using a second private key of a destination device asymmetric key pair. The digital asset transaction computer system may verify that the destination account identifier is associated with a digital asset account having an owner with an identity known to the digital asset transaction computer system. In embodiments, the signed electronic offer may be received from a destination autonomous device associated with the destination account identifier. In embodiments, the signed electronic offer may be received from the first autonomous device, which received the signed electronic offer from a destination autonomous device associated with the destination account identifier.

BRIEF DESCRIPTION OF THE DRAWINGS

Exemplary embodiments of the present invention will be described with references to the accompanying figures, wherein.

DETAILED DESCRIPTION OF THE INVENTION

Figure 1:
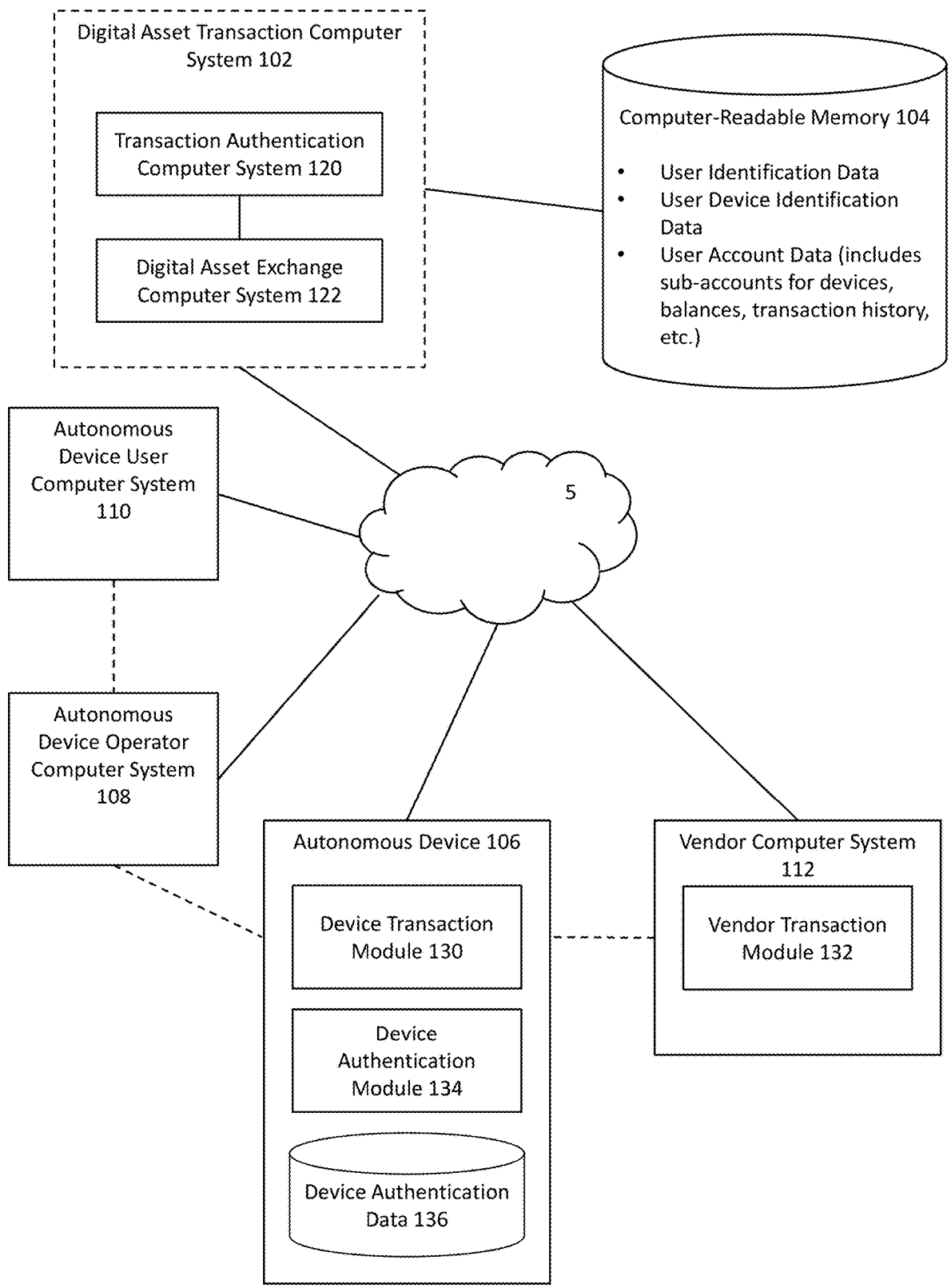
FIG. 1 is a schematic diagram of a digital asset authentication and transaction system for autonomous devices in accordance with exemplary embodiments of the present invention.

The present invention generally relates to autonomous devices and systems, methods, and program products for authorizing and performing transactions by autonomous devices. Autonomous devices may comprise one or more processors and non-transitory computer-readable memory with one or more software modules stored thereon and running or configured to run on the one or more processors. The software modules may comprise programmed rules and/or may be configured to develop rules to govern device behavior. Autonomous devices may request to engage in transactions (e.g., from a user device operated by a user, from a vendor, and/or from a financial management system). Autonomous devices may engage in transactions autonomously, in response to user requests (e.g., received from a user device or via an input device), or in response to pre-programmed rules (e.g., to make a purchase when programmed thresholds are reached or exceeded). Accordingly, autonomous devices may act as agents of a user (e.g., who is the principal in the agency relationship) to carry out one or more functions involving a financial transaction, such as executing a purchase. In embodiments, such functions can include shopping and/or transportation (e.g., where the financial transaction comprises a fuel payment, a toll payment, a rental payment for use of the autonomous device, to name a few).

Autonomous devices may be pre-authorized to engage in transactions (such as an electric car recharging or a car with a gas engine filling its gas tank) on behalf of a user. The autonomous device may transact using an account (e.g., a sub-account) associated with a user financial account. The user may set rules governing use of the account (e.g., frequency of transactions, spending limits, automated account replenishment rules, transaction pre-approval rules (e.g., requiring pre-approval for certain transactions or certain devices, and/or providing pre-approval for certain transactions or certain devices). Transaction rules may comprise fixed amounts, percentages, periods of time, and/or rates, to name a few.

In the exemplary systems illustrated in the figures described herein, each computer system may include one or more processors and non-transitory computer-readable memory with one or more software modules stored thereon and running or configured to run on the one or more processors. Each computer system may also include one or more communication portals, which may handle, process, support, and/or perform wired and/or wireless communications (e.g., transmitting and/or receiving data). Communications systems can comprise hardware (e.g., hardware for wired and/or wireless connections) and/or software. In embodiments, communications systems can include one or more communications chipsets, such as a GSM chipset, CDMA chipset, LTE chipset, Wi-Fi chipset, Bluetooth chipset, to name a few, and/or combinations thereof. Wired connections may be adapted for use with cable, plain old telephone service (POTS) (telephone), fiber (such as Hybrid Fiber Coaxial), xDSL, to name a few, and wired connections may use coaxial cable, fiber, copper wire (such as twisted pair copper wire), and/or combinations thereof, to name a few. Wired connections may be provided through telephone ports, Ethernet ports, USB ports, and/or other data ports, such as Apple 30-pin connector ports or Apple Lightning connector ports, to name a few. Wireless connections may include cellular or cellular data connections and protocols (e.g., digital cellular, PCS, CDPD, GPRS, EDGE, CDMA2000, 1xRTT, Ev-DO, HSPA, UMTS, 3G, 4G, and/or LTE, to name a few), Bluetooth, Bluetooth Low Energy, Wi-Fi, radio, satellite, infrared connections, ZigBee communication protocols, to name a few. Communications interface hardware and/or software, which may be used to communicate over wired and/or wireless connections, may comprise Ethernet interfaces (e.g., supporting a TCP/IP stack), X.25 interfaces, T1 interfaces, and/or antennas, to name a few. Computer systems may communicate with other computer systems or devices directly and/or indirectly, e.g., through a data network 5, such as the Internet, a telephone network, a mobile broadband network (such as a cellular data network), a mesh network, Wi-Fi, WAP, LAN, and/or WAN, to name a few.

The invention is described with respect to autonomous devices. However, the identity authentication systems and processes of the present invention may be applied to any user, device (autonomous or user-controlled), and/or account requiring identity verification and/or fraud detection.

Turning to FIG. 1, a digital asset authentication system for autonomous devices can include one or more autonomous devices 106, an autonomous device operator computer system 108, an autonomous device user computer system 110, and/or a vendor computer system 112. The system can also include a digital asset transaction computer system 102, which may comprise a digital asset transaction authentication computer system 120 and/or a digital asset exchange computer system 122. A digital asset exchange computer system 122 may provide, execute, and/or facilitate one or more transactions, such as payments and/or exchanges of digital assets. In embodiments, the digital asset exchange computer system 122 may handle fiat currency transactions. In embodiments, a digital asset transaction authentication computer system 120 and a digital asset exchange computer system 122 may be separate computer systems. In embodiments, they may have a common owner or operator. In embodiments, a digital asset transaction authentication computer system 120 and a digital asset exchange computer system 122 may be the same computer system. Accordingly, the functions of a digital asset transaction authentication computer system 120 and a digital asset exchange computer system 122 are described herein with respect to an exemplary digital asset transaction computer system 102.

The digital asset transaction computer system 102 may be operatively connected to non-transitory computer-readable memory 104, which may be internal or external memory. Such memory may comprise a plurality of memory storage devices and/or may comprise one or more databases. The memory 104 may store user identification data (e.g., login credentials, biometric data, security codes, multi-factor authentication data, to name a few). Memory 104 may also store user device identification data, which may comprise descriptions, device nicknames, serial numbers, digital signatures, or other information from which a device, such as an autonomous device, may be recognized (e.g., by a vendor computer system, by the digital asset transaction computer system 102, by a user computer system 110, by other autonomous devices, to name a few).

A vendor computer system 112 may include a vendor transaction module 132, which may handle payments (e.g., determine payment amounts, request payment amounts, receive payment amounts, to name a few) and/or which may request transaction authorization from a digital asset transaction computer system 102 (e.g., to verify that an autonomous device is associated with a known user, to verify that an autonomous device is authorized to transact by its user principal, to verify that an autonomous device is authorized to transact by one or more government or regulatory agencies, and/or to verify that sufficient funds are available in a device account, to name a few).

An autonomous device 106 may have a device transaction module 130, which may request a transaction from a vendor computer system 112, request transaction authorization from a user (e.g., by communicating with a user computer system 110 or other user electronic device, such as a computer, tablet computer, personal digital assistant (PDA), cell phone, smart phone, to name a few), and/or enter into a transaction, to name a few. The device transaction module 130 may generate and/or transmit an electronic transaction request to the digital asset transaction computer system 102. The request may comprise transaction parameters, such as a destination device identifier (e.g., a unique alphanumeric sequence) and/or destination account identifier (e.g., a digital asset address), an autonomous device identifier associated with the autonomous device 106, a source account identifier, which may indicate a master account digital asset associated with the autonomous device 106 and/or a respective sub-account, a transaction amount, a transaction request timestamp, and/or a device location, to name a few.

The autonomous device 106 can further comprise a device authentication module 134, which may digitally sign electronic transaction requests. A digital signature may comprise encrypting data, such as the requested transaction parameters, using a private key of an asymmetric key pair associated with the autonomous device 106. In embodiments, the corresponding public key of the asymmetric key pair may be provided along with the encrypted message so that the receiving device can decrypt the data to verify the digital signature. The digital signature may provide an assurance of the message integrity and/or of the identity of the sending autonomous device 106. In embodiments, the autonomous device 106 may encrypt an electronic message using a public key associated with the digital asset transaction computer system 102, such that only the digital asset transaction computer system 102 can decrypt the message using its corresponding private key to view and/or access the message contents and/or payload.

In embodiments, the device may generate and/or transmit authentication data to the digital asset transaction computer system 102. The authentication data can comprise a data value, such as a randomly generated number, which may be transmitted along with a previous data value so as to provide assurance that the same autonomous device 106 is sending the messages without its identity being mimicked or spoofed. If the digital asset transaction computer system 102 determines that the previous authentication data value does not match a locally stored copy of the last received data value, then a second device likely transmitted either the currently received message or the previous message, and all messages or transaction requests apparently coming from the autonomous device 106 may be flagged and/or rejected.

In embodiments, the authentication data value may comprise a hash value computed according to a hash algorithm or hash function. The hash function may be a cryptographic hash function, which is designed to be a one-way function from which it is easy (e.g., not computationally intensive and/or time intensive) to reproduce results but difficult to reverse the function given the result. Examples of hash functions are SHA-1, SHA-2, SHA-256, and MDA, to name a few. The hash value may hash a previous hash value along with new data, such as any of a random number, all or part of the transaction data, a timestamp, GPS coordinates or other geolocation or position data (e.g., position of the device, position associated with a transaction location or merchant location, to name a few), and/or a device identifier, to name a few. In embodiments, any continuously or periodically generated information may be used, e.g., as an input to a hash algorithm, to generate the hash value. The hash value and the new data may be provided to the digital asset transaction computer system 102, which may compute a verification hash value based upon a stored copy of a last previously received hash value and the new data. If the resulting verification hash value does not match the newly received hash value, there was a discrepancy in the underlying data, namely the previous hash value, indicating either that the message originated from a different device posing as the autonomous device 106 or that the previously received message originated from a different device. Accordingly, the device authentication module 134 may generate and/or maintain a hash chain, which is a sequence of linked hash values linked by using the last previous hash value as an input into the hash algorithm to produce the next hash value. The hash chain may be a version of a blockchain, in which successive data entries or blocks are linked to the previous blocks. A fraudulent or impostor device can cause a fork in this authentication blockchain since the fraudulent device's version of the blockchain will be adding different entries or blocks from the true device. Thus when more than one device attempts to pose as the same device, detectable forks can be created. In embodiments, the device may store the previous hash value for use in generating the next hash value, and the entire sequence of hash values may not be stored individually, as they have each been incorporated into each successive hash value.

In embodiments, the authentication data may be transmitted regularly and/or periodically, such as according to a schedule (e.g., at predefined dates and/or times) and/or at a predefined frequency (e.g., once every hour, once every 30 minutes, once every 5 minutes, once every 30 seconds, to name a few). In embodiments, the authentication data may be transmitted according to a randomized and/or aperiodic schedule. The authentication data transmissions may comprise a device heartbeat that uniquely identifies the device. Such transmissions that are continuous and/or frequent can enable rapid detection of a compromised autonomous device 106, which may be compromised by fraudulent duplication or mimicking and/or by hacking or takeover to send unauthorized transaction requests. The detection may occur within one period of the heartbeat frequency and/or following the time of a scheduled heartbeat transmission. In the case of mimicking the authentication data transmissions must also be mimicked accurately and/or, in certain embodiments, without interruption. If they are not so mimicked, there will be a discrepancy determined at the digital asset transaction computer system 102, which can flag the device 106 or apparent device 106. In the case of hacking, an interruption in the heartbeat may signal that the device 106 was compromised.

In embodiments, the authentication data may be transmitted along with and/or as part of electronic transaction requests or may be triggered to be transmitted before or after transmitting an electronic transaction request. Authentication data transmitted as such will enable a collision or discrepancy in the authentication data to be detected at the digital asset transaction computer system 102 once authentication data has been received from two different devices.

The autonomous device 106 may store device authentication data 136, which may include the device asymmetric key pair. The device authentication data can also include at least the previous authentication data value, which may be a hash value. In embodiments, the device authentication data can include the hash chain.

The device authentication module 134 may comprise a hardware security module, which may be a physically secure processing device that can store the device's asymmetric key pair and/or use it to generate digital signatures. The hardware security module may also generate the authentication data and/or perform any other required cryptographic operations. Upon detection of tampering, the hardware security module may destroy and/or delete its contents. The hardware security module may generate alerts when tampering is detected and/or may provide auditable logs that can be examined to identify unauthorized access.

In embodiments, one or more software modules, such as a device authentication module 134, and/or software libraries may be provided for download and/or installation on one or more devices, such as user devices and/or autonomous devices, to enable such devices to take advantage of the identity verification and/or transaction authorization and/or execution systems and methods of the present invention. Accordingly, a transaction module or a payment module may be provided for installation, integration, modification, and/or use by a device to perform transactions, identity verifications, and/or to implement fraud avoidance methods. Such devices may be registered with the digital asset transaction computer system 102. In embodiments, the digital asset transaction computer system 102 may provide an application programming interface (API) that can be used be one or more devices to transact, verify identities, and/or monitor for fraud.

An exemplary transaction process involving an autonomous device 106 can include any of the following steps. An autonomous device 106 may request device account status information from a digital asset transaction computer system 102. Such status information can include a device account balance. The transaction computer system 102 may determine and/or retrieve the device account balance and transmit it to the device 106. The autonomous device 106 may request a purchase transaction from a vendor computer system 112 (e.g., by communicating directly with the vendor computer system 112 or with a vendor point of sale, such as a product scanner or digital asset register). A vendor point of sale system may relay transaction information (e.g., device identification information, vendor identification information, and/or transaction parameters, such as prices and/or quantities, to name a few) to a vendor remote system, which may be the vendor computer system 112. In embodiments, the vendor computer system 112 may in fact be the point of sale system. In embodiments, the processes described herein with respect to the vendor computer system 112 may be performed by a vendor point of sale system and/or by a vendor remote system. The vendor computer system 112 may request transaction authorization from the digital asset transaction computer system 102. Accordingly, the vendor computer system 112 may transmit the transaction information to the digital asset transaction computer system 102. In embodiments, the autonomous device 106 may request the authorization from the digital asset transaction computer system 102.

The digital asset transaction computer system 102 may then analyze the transaction information, evaluating it using stored transaction rules and/or by comparing it against transaction permissibility data (e.g., acceptable transaction parameters or thresholds, device-specific thresholds, device account thresholds, limits, or permissions, and/or vendor permissions, such as data identifying approved vendors) stored in one or more databases. The digital asset transaction computer system 102 may ensure that the device is not flagged and/or that it is associated with a registered user who is also not flagged (e.g., to ensure compliance with anti-money laundering laws, know your customer laws, bank secrecy rules). Accordingly, the digital asset transaction computer system 102 may determine that an autonomous device 106 is authorized to engage in the transaction and/or may transmit an electronic authorization notification to the vendor computer system 112. The vendor computer system 112 may then proceed with the transaction, which may comprise transacting directly with the autonomous device and/or indirectly by instructing the digital asset transaction computer system 102 (e.g., a digital asset exchange computer system 122) to execute the transaction. In the case of an indirect transaction the digital asset transaction computer system 102 may request purchase authorization from a user principal (e.g., by transmitting an electronic authorization request to a user electronic device). Where the vendor computer system 112 requests the transaction the digital asset transaction computer system 102 may also transmit a transaction parameter confirmation to the autonomous device 106 to prevent vendors systems from executing unsolicited transactions. Upon receipt of transaction parameter confirmation and/or purchase authorization, the digital asset transaction computer system 102 may execute the transaction and/or generate and transmit an electronic transaction notification to the vendor computer system 112, the autonomous device 106, and/or the user electronic device of the user principal.

Although the transaction herein are described with respect to digital assets they may comprise fiat transactions performed by a bank and/or financial exchange, which may be a digital asset exchange that also handles fiat transactions. In embodiments, autonomous devices or devices with embedded or operatively connected computer systems may perform exchange transactions, e.g., to purchase digital assets from a digital asset exchange and/or to purchase fiat currency amounts from an exchange.

In other embodiments, autonomous device transactions may comprise purchases of goods and/or services directly from sellers (e.g., individuals with respective seller user electronic devices, other autonomous devices, and/or seller computer systems, to name a few). Such transactions can comprise electronic transfers of funds, such as digital assets or fiat amounts. Transfers of digital assets may be performed on an internal electronic ledger of a transaction computer system 102 (e.g., a digital asset exchange computer system 122). In embodiments, transfers of digital assets may be broadcast to and/or performed using a public ledger, such as a decentralized public ledger (e.g., a blockchain such as the Bitcoin Blockchain). Such transactions may be broadcast by the autonomous device 106, the vendor computer system 112, and/or the digital asset transaction computer system 102. The systems and processes of the present invention may be used to provide (or deny) authorization for any such transactions.

In embodiments, an autonomous device may determine times at which to purchase goods or services, such as fuel or electricity, which determination may be based at least in part upon present need, anticipated need (e.g., predictions based upon usage and/or usage patterns), and/or based upon cost (e.g., determining when cost, such as electricity supply cost, is lowest).

The autonomous device authorization systems and processes described herein may ensure compliance with regulations, such as anti-money laundering laws, know your customer laws, and/or bank secrecy rules, regardless of the place of domicile of the autonomous devices (e.g., whether operating domiciled in a different U.S. state or a different country from the purchase location). In embodiments, compliance with such regulations may be assessed upon a first transaction request by a device at a particular vendor or upon an individual's first contracting of use of an autonomous device. In other embodiments, compliance may be assessed for each requested transaction or may be assessed periodically.

These processes and systems may also enable compliance with government or other regulations as well as compliance with user-generated transaction rules for autonomous devices that are not owned by the principal user but are instead being rented or leased by the principal user. Accordingly, an autonomous device operator computer system 108 may own and/or operate the autonomous device, and a user may contract with the operator for use of the autonomous device (e.g., to perform one or more tasks, or for use at the user's will for a particular time period). Any transactions performed or sought to be performed by the autonomous device 106 may then be associated with the particular user for whom the device 106 is acting as an agent. The operator may be a company that sells or rents autonomous devices or that handles daily operation of the devices, such as navigation or other operational processes.

Figure 2:
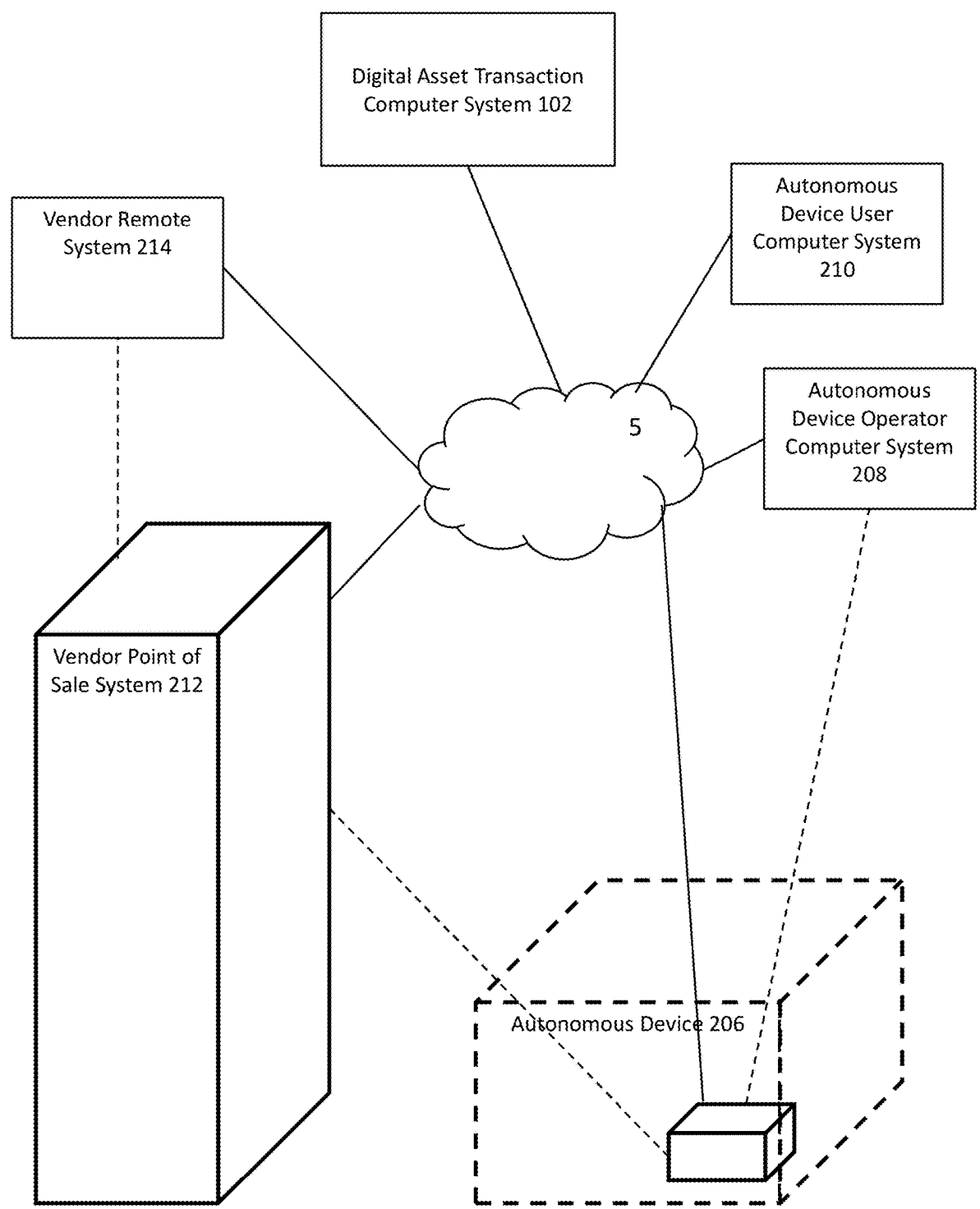
FIG. 2 is a schematic diagram of a digital asset authentication and transaction system for autonomous devices in accordance with exemplary embodiments of the present invention.

FIG. 2 is a schematic diagram of a digital asset authentication and transaction system for autonomous devices in accordance with exemplary embodiments of the present invention. The autonomous device 206 may be an autonomous vehicle. It may include one or more computer systems 240. For example, a navigation computer system may control the transportation performance of the device, while a transaction computer system controls transactions. In embodiments, software modules running on the same computer system 240 may perform such functions. The vendor point of sale system 212 may be a gas station or an electric recharging station. The autonomous device 206 may be authorized (e.g., via user-defined rules input to the digital asset transaction computer system 102 and transformed into electronic processing rules at the digital asset transaction computer system 102) to perform transactions meeting certain predefined criteria, such as only purchasing a particular type of good (e.g., fuel) or service (e.g., automotive repair), not exceeding a threshold spending limit (e.g., within a time period), and/or only transacting with particular vendors.

Figure 3:
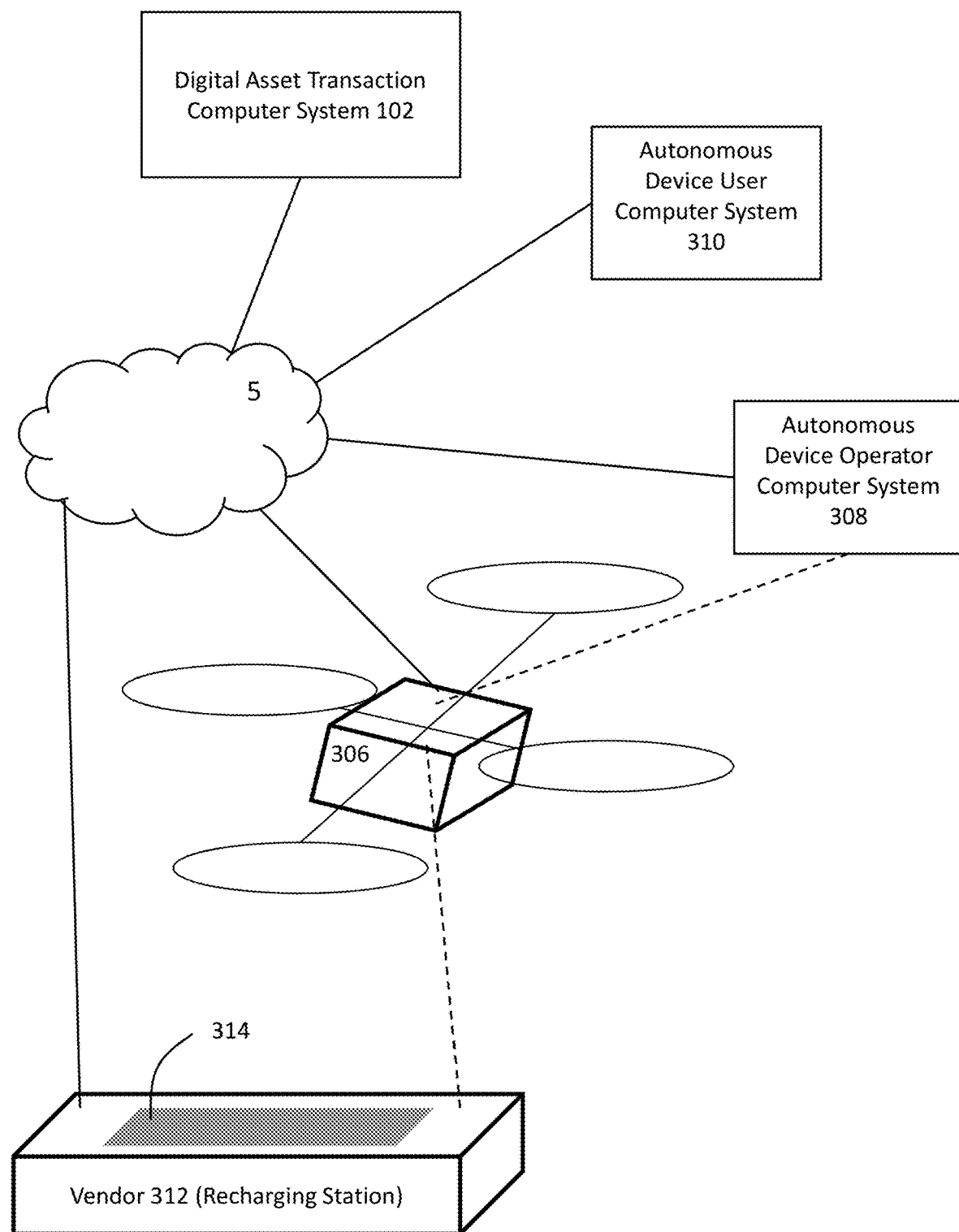
FIG. 3 is a schematic diagram of a digital asset authentication and transaction system for autonomous drone vehicles in accordance with exemplary embodiments of the present invention.

FIG. 3 is a schematic diagram of a digital asset authentication and transaction system for autonomous drone vehicles in accordance with exemplary embodiments of the present invention. A drone vehicle 306 may be an aerial vehicle, such as an unmanned aerial vehicle. Such drones may be operated by an operator with an associated operator computer system 308. An individual may contract for use of the drone 306. Accordingly, using the authorization and transaction systems described herein, any transactions performed on behalf of the contracting user may be associated with that user since the drone 306 is acting as the agent of that user. In other embodiments, a company or individual may own and/or operate the drone 306, and transactions performed by the drone 306 (e.g., recharging batteries, paying tolls, paying for parking, paying for repair, paying for goods or services) will be associated with the company or individual.

Figure 4:
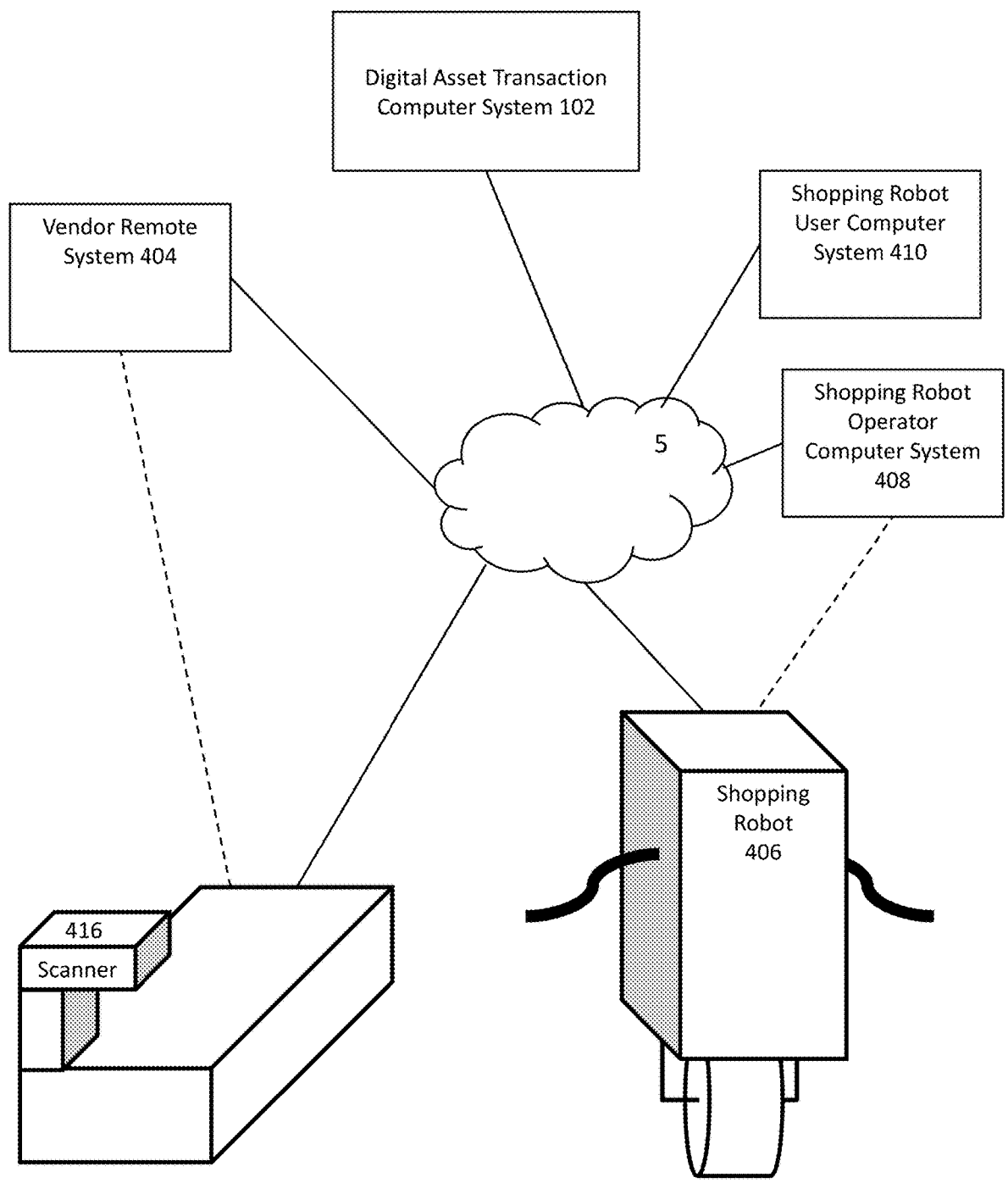
FIG. 4 is a schematic diagram of a digital asset authentication and transaction system for autonomous drone shopping agents in accordance with exemplary embodiments of the present invention.

FIG. 4 is a schematic diagram of a digital asset authentication and transaction system for autonomous drone shopping agents in accordance with exemplary embodiments of the present invention. An autonomous or remotely controlled robot may shop on behalf of a user principal. In embodiments, an autonomous shopping computer may perform remote transactions, such as online shopping. The computer may be authorized as an agent of an individual to perform such transactions. Accordingly, a computer may monitor prices and/or inventory availability and transact when price or inventory thresholds are reached. Such transactions may not require user authorization at the time of transaction but may instead use a sub-account designated for the shopping computer and associated with a user umbrella account.

Figure 5:
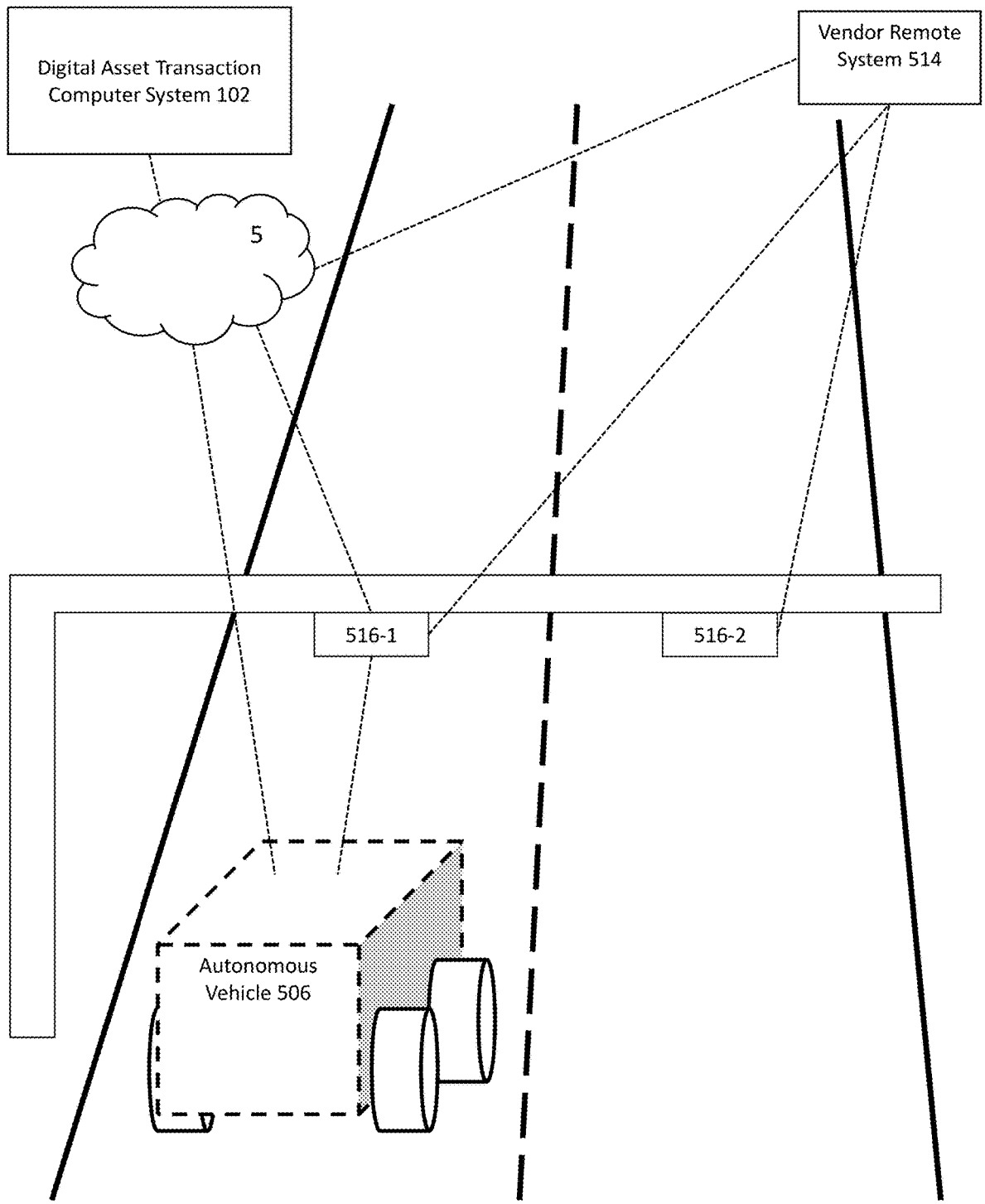
FIG. 5 is a schematic diagram of a digital asset authentication and transaction system for autonomous vehicle toll payments in accordance with exemplary embodiments of the present invention.

FIG. 5 is a schematic diagram of a digital asset authentication and transaction system for autonomous vehicle toll payments in accordance with exemplary embodiments of the present invention. An autonomous vehicle 506 (which may operate in any transportation medium or terrain) may pay tolls automatically using a vehicle digital asset account. Toll scanners 516 may detect and/or identify vehicles and/or may request transactions (e.g., payment of a toll). In embodiments, an autonomous vehicle 506 may communicate directly with a vendor remote system 514, which may transact with the vehicle 506 to request and/or accept payment of a toll.

Figure 6:
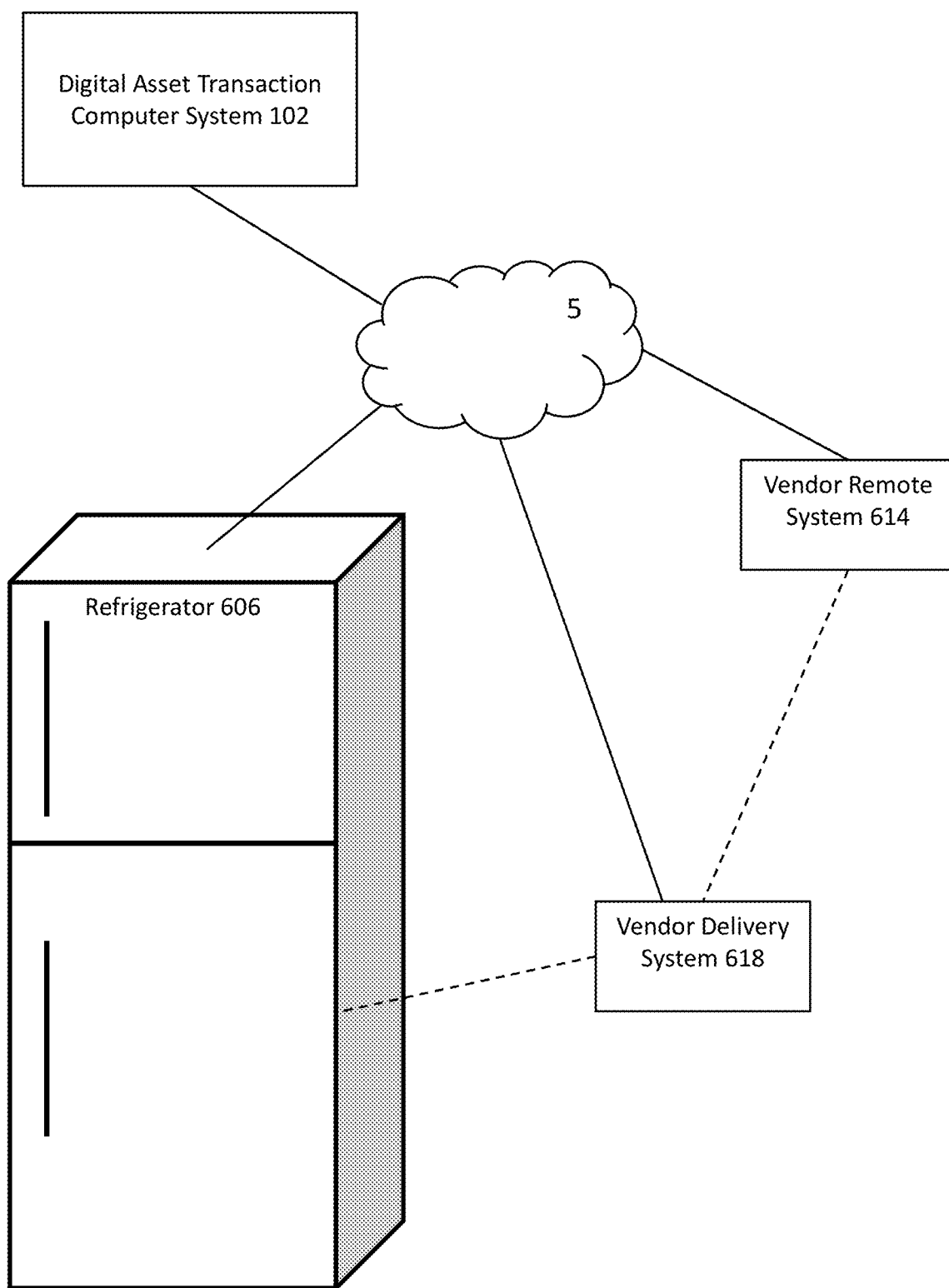
FIG. 6 is a schematic diagram of a digital asset authentication and transaction system for networked appliances engaging in transactions in accordance with exemplary embodiments of the present invention.

FIG. 6 is a schematic diagram of a digital asset authentication and transaction system for networked appliances engaging in transactions in accordance with exemplary embodiments of the present invention. Services may repair appliances, replenish appliances (such as a refrigerator 606), and/or transport appliances or machines (e.g., construction equipment). The device itself may pay for the respective goods or services. Such a system may enable highly itemized transactions and transaction tracking. For example, a package being delivered with an embedded smart payment chip (which can function for transaction purposes like the autonomous devices described herein) may pay for its own delivery. It may pay separately for multiple legs of a delivery, such as air transportation followed by ground transportation to a distribution center followed by ground transportation to the final destination. In other embodiments, autonomous delivery vehicles may scan or otherwise receive a package identifier and request payment based upon the performed transportation of the package.

Figure 7:
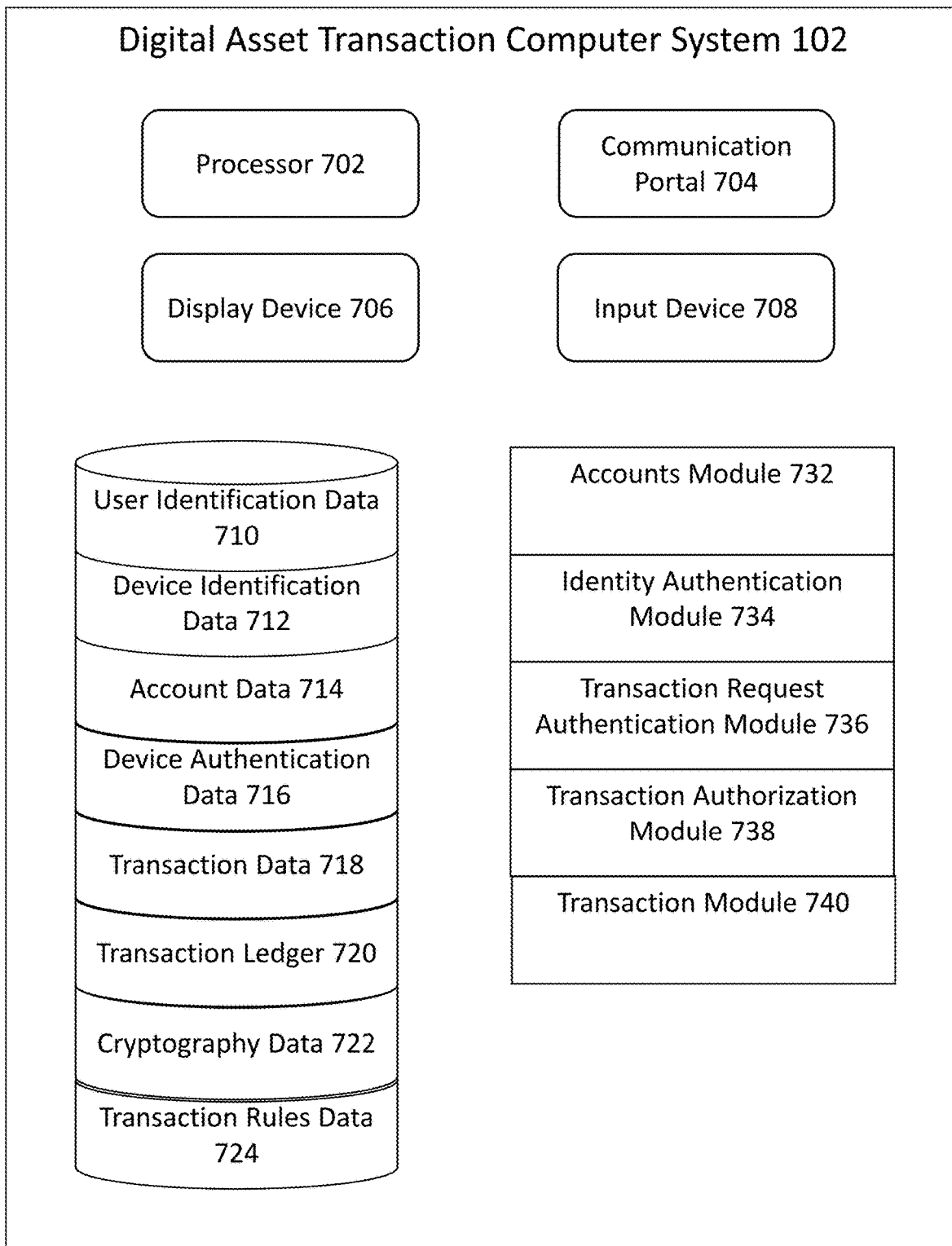
FIG. 7 is a schematic diagram of a digital asset transaction computer system in accordance with exemplary embodiments of the present invention.

FIG. 7 is a schematic diagram of a digital asset transaction computer system in accordance with exemplary embodiments of the present invention. The digital asset transaction computer system 102 can include any of one or more processors 702, communication portals 704, display devices 706, and/or input devices 708 (e.g., keyboards, mice, touchscreens, microphones, cameras, to name a few). The computer system can further include non-transitory computer-readable memory, which may comprise one or more databases, operatively connected to the one or more processors 702, and which may store user identification data 710, device identification data 712, account data 714, device authentication data 716, transaction data 718, an electronic transaction ledger 720, cryptography data 722, and/or transaction rules data 724, as described herein. The computer system can also include one or more software modules running or configured to run on the one or more processors 702. The modules can include an accounts module 732, an identity authentication module 734, a transaction request authentication module 736, a transaction authorization module 738, and/or a transaction module 740. In embodiments, processes and roles described with respect to one module may be performed by one or more other modules. In embodiments, a particular module may perform operations described with respect to one or more other modules.

User identification data 710 can include legal names, nicknames, account usernames, login credentials (e.g., password and/or other authentication data), and/or contact information (e.g., phone number, mailing address, electronic address, such as an email address), to name a few. In embodiments, user identification data 710 may satisfy anti-money laundering regulations and/or know your customer regulations.

Device identification data 712 can comprise device identifiers and/or device make and/or model identifiers, to name a few.

Account data 714 can comprise account addresses, master account information, sub-account information (e.g., for accounts subordinate to or that are divisions of a master account), account owner or administrator information (e.g., identifications of individuals or entities such as businesses that own or are authorized to use an account), and/or account balances, to name a few.

Device authentication data 716 can include a hash chain or last received hash value. Device authentication data 716 can include logs of authentication data received from one or more devices.

Transaction data 718 can include transaction history information (e.g., transaction parameters, transaction execution information, transaction statuses) for one or more accounts, users, and/or devices.

An electronic transaction ledger 720 may provide an electronic record of transactions, from which may be determined account balances. The computer system can also store a local instance of a distributed electronic public ledger for a digital asset network.

Cryptography data 722 can include asymmetric key data (e.g., a private/public key pair for the digital asset transaction computer system 102 and/or public keys associated with one or more users, accounts, or devices), digital signature algorithms, encryption and/or decryption algorithms, and/or hashing algorithms.

Transaction rules data 724 can comprise one or more logical rules or restrictions to govern transaction authorization for one or more accounts, sub-accounts, devices, and/or users. In embodiments, transaction rules specified for a master account may apply to each sub-account of the master account. In embodiments, further rules may be specified for the sub-accounts, which may be in addition to or may supersede the master account rules. The rules data can comprise threshold values, such as a maximum spend limit, a minimum required account balance, an allowable transaction frequency, and/or allowable transaction times, to name a few. The rules data can also require pre-authorization, such as from an administrator or owner of a master account. The rules data can specify acceptable payees and/or types of acceptable purchases (e.g., fuel, groceries, to name a few).

An accounts module 732 may manage one or more accounts, which can be digital asset accounts and/or fiat accounts. An accounts module 732 may maintain one or more omnibus accounts. The accounts module 732 may interact with one or more bank accounts, investment accounts, or other fiat accounts.

An identity authentication module 734 may verify a device identity, e.g., by evaluating received authentication data, which can include comparing a received previous authentication data value to a last received current authentication value. The identity authentication module may compute a verification hash value based upon newly received data and a last received hash value and may compare the verification hash value to a newly received hash value to determine whether the values are equal. The identity authentication module 734 may provide a certificate and/or other electronic message, e.g., to a transaction counter-party, indicating the identity of the device and/or device's owner or operator.

A transaction request authentication module 736 may evaluate a digital signature to determine the authenticity of a received electronic transaction request.

A transaction authorization module 738 may evaluate transaction parameters and/or transaction information with respect to transaction rules to determine whether the transaction is authorized.

A transaction module 740 may execute one or more transactions according to received transaction parameters.

FIGS. 8A-F are flow charts of exemplary processes for performing transactions involving autonomous devices in accordance with exemplary embodiments of the present invention.

Figure 8A:
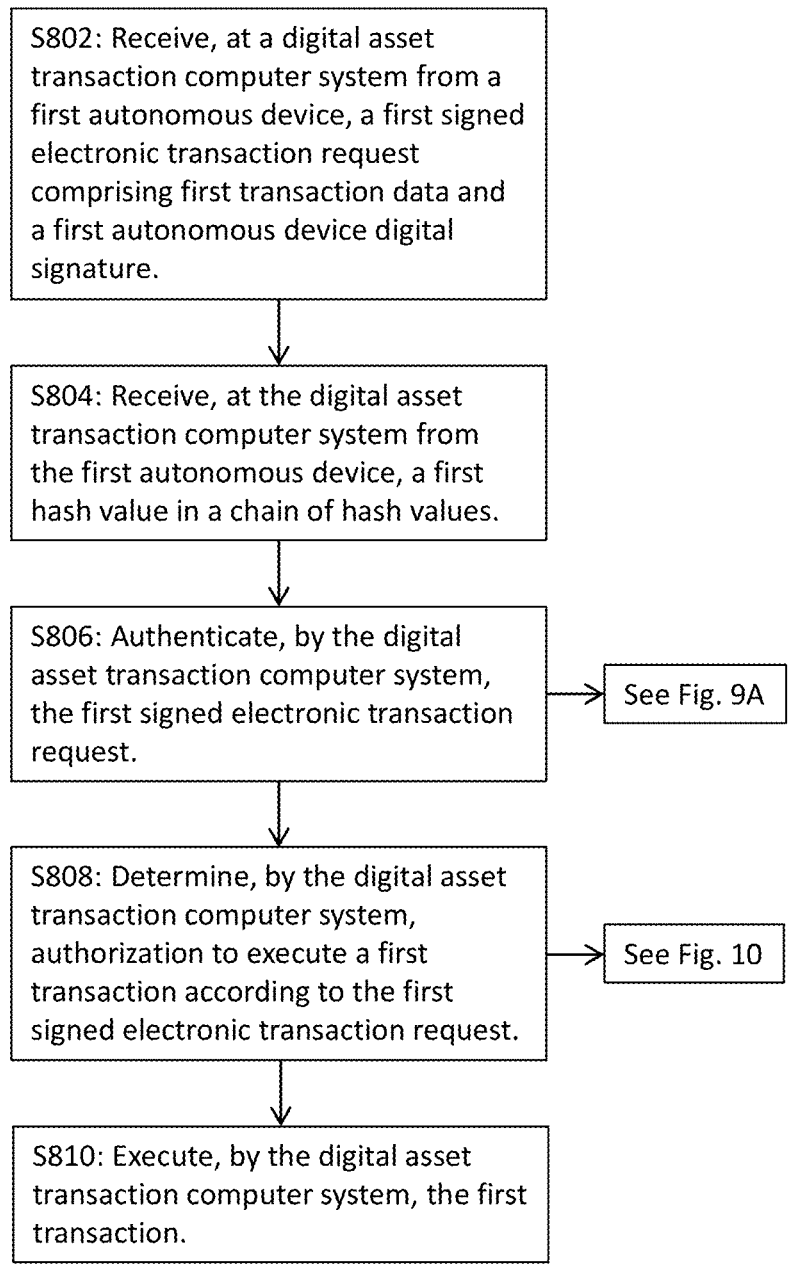
FIGS. 8A-F are flow charts of exemplary processes for performing transactions involving autonomous devices in accordance with exemplary embodiments of the present invention.

FIG. 8A is a flow chart of an exemplary process for performing transactions involving autonomous devices that generate an authentication hash chain and transmit the newest value of the hash chain to a transaction computer system to establish device authenticity.

In a step S802, a digital asset transaction computer system may receive from a first autonomous device, a first signed electronic transaction request comprising first transaction data and a first autonomous device digital signature. In embodiments, the first transaction data can comprise a sending account identifier associated with the first autonomous device, a destination account identifier, a transaction amount, and/or a timestamp (e.g., a timestamp based upon an internal clock of the first autonomous device). In embodiments, the first autonomous device digital signature may have been generated by the first autonomous device using a first private key of a first autonomous device asymmetric key pair, e.g., to encrypt the first transaction data, a portion of the first transaction data, or other data payload contents that are being signed. In embodiments, the first signed electronic transaction request may be encrypted by the first autonomous device using a public key of a digital asset transaction computer system asymmetric key pair such that only the digital asset transaction computer system can decrypt the request using its corresponding private key. In embodiments, the first transaction data may be in a computer-readable format, such as JSON data.

In a step S804, the digital asset transaction computer system may receive from the first autonomous device a first hash value in a chain of hash values. The first hash value may have been computed by the first autonomous device by applying a hash algorithm to first data. In embodiments, the first data can include first new data and a first previous hash value in the chain of hash values, the first previous hash value computed by applying the hash algorithm to first previous data not including the first new data. In embodiments, the first hash value may be received along with the first signed electronic transaction request. The first signed electronic transaction request may include the first hash value. In embodiments, the first hash value may be transmitted periodically (e.g., according to a predefined schedule and/or frequency) and/or aperiodically (e.g., according to a randomized schedule), which transmission may be independent of the first signed electronic transaction request.

In embodiments, the first hash value may be generated and transmitted in response to a triggering event, which may be any of the generation of the first signed electronic transaction request, an electronic hash value request received from the digital asset transaction computer system, an electronic hash value request received from an administrator computer system associated with management of the autonomous device, or a scheduled trigger, to name a few.

Figure 9A:
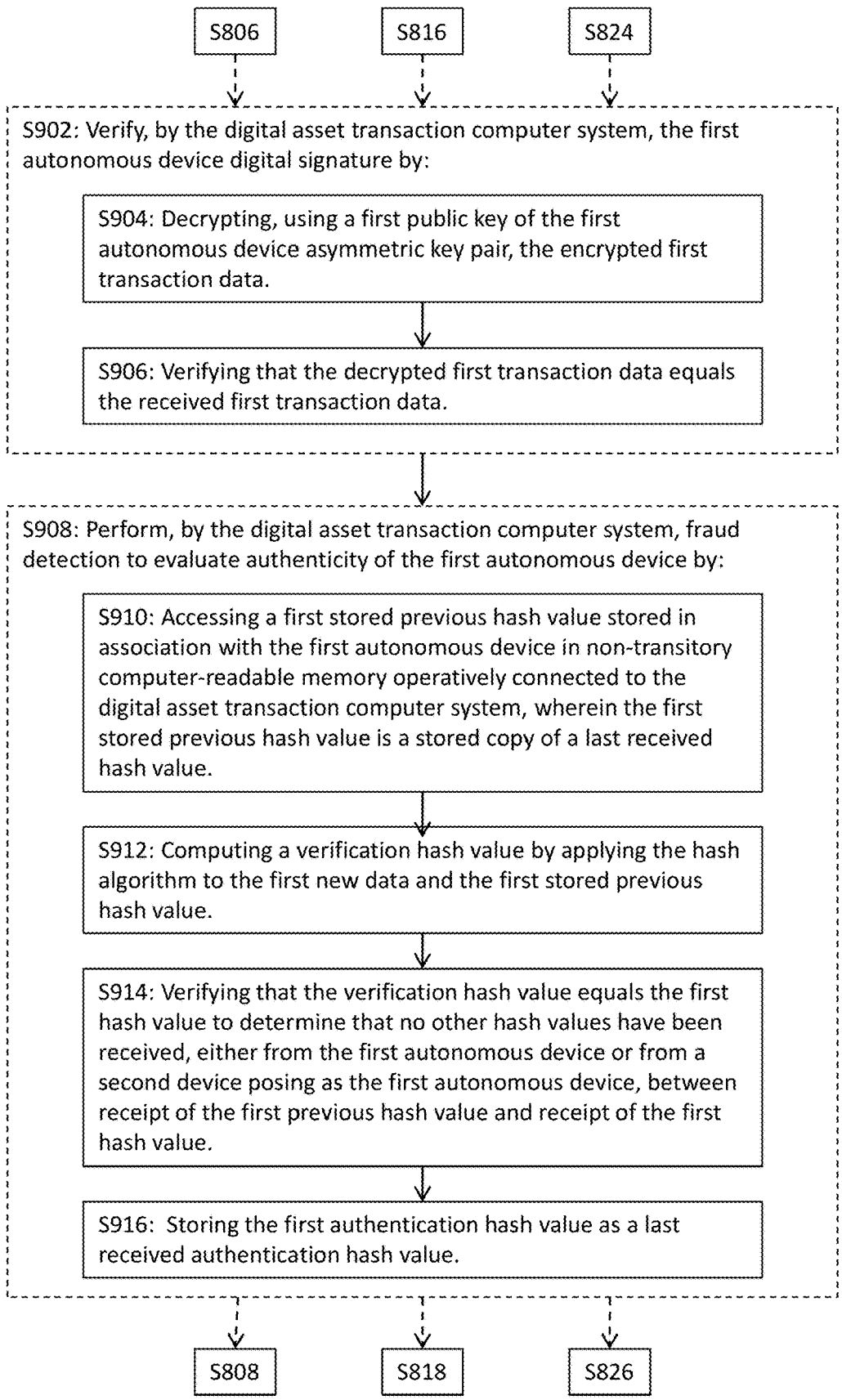
FIGS. 9A-B are flow charts of exemplary processes for authenticating electronic transaction requests in accordance with exemplary embodiments of the present invention.

In a step S806, the digital asset transaction computer system may authenticate the first signed electronic transaction request, as described with respect to FIG. 9A.

Figure 10:
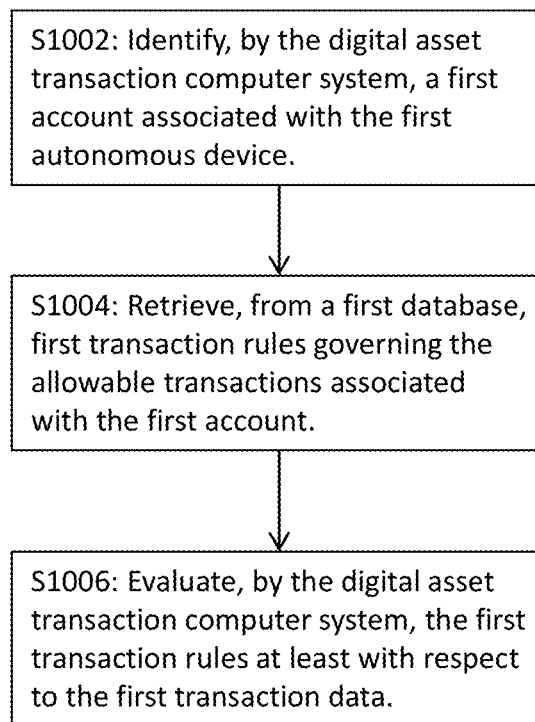
FIG. 10 is a flow chart of an exemplary process for determining transaction authorization in accordance with exemplary embodiments of the present invention.

In a step S808, the digital asset transaction computer system may determine authorization to execute a first transaction according to the first signed electronic transaction request, as described herein with respect to FIG. 10. The computer system may evaluate the transaction parameters and/or additional information (e.g., transaction history, time, device location, account balances, vendor identification, goods or services being purchased, to name a few) with respect to stored transaction rules to determine whether the requested transaction satisfies the rules. In embodiments, a device owner or operator can specify at the transaction computer system the required additional information fields for evaluation and can program the device accordingly to provide such information. In embodiments, such additional information may be provided in a computer-readable format, such as JSON data.

In a step S810, the digital asset transaction computer system may execute the first transaction. In embodiments, the digital asset transaction computer system may initiate and/or execute a transfer of funds (e.g., digital assets) from a sending account associated with the sending account identifier to a receiving account associated with the destination account identifier. In embodiments, the digital asset transaction computer system may execute the transfer by creating an electronic ledger entry in a local digital asset transaction ledger and/or by updating one or more ledger entries (e.g., account balance entries) in the local digital asset transaction ledger. In embodiments, the digital asset transaction computer system may generate and/or transmit electronic transaction instructions to a digital asset network for inclusion in a distributed public electronic transaction ledger (e.g., the Bitcoin Blockchain).

In embodiments, the digital asset transaction computer system may provide confirmation of an autonomous device's identity by transmitting an identity authentication electronic message to a transaction counter-party (e.g., a vendor) and/or by providing a signed certificate to one or more transaction parties (such as directly to the counter-party or to the autonomous device, which can share the certificate with counter-parties). In embodiments, such a certificate may be signed with a private key of the digital asset transaction computer system. The certificate may have an expiration date and/or may comprise a timestamp associated with the certificate creation time. In embodiments, such identity confirmation services may be provided for any user or device, not only autonomous devices. In embodiments, either party to the transaction may request an identity confirmation certificate for itself or for the other party. In embodiments, the digital asset transaction computer system may provide an electronic identity confirmation along with payment to the counter-party (e.g., as an electronic message embedded in a payment transaction log, as an independent message or certificate, and/or as an electronic message broadcast or otherwise transmitted to be included in a digital asset network blockchain entry).

In embodiments, a transaction counter-party, such as a seller, can provide a digitally signed offer to the purchasing device. The offer may be provided along with the electronic transaction request. The transaction computer system may verify the offer such as by authenticating its digital signature and/or may check that the requested transaction parameters meet (e.g., do not exceed) the transaction requirements of the offer (e.g., correct transaction amount, correct destination address). The offer may indicate a category of goods or services being purchased, an itemized list of goods or services being purchased, and/or seller information, which offer information may be stored by the transaction computer system in a transaction history log.

Figure 8B:
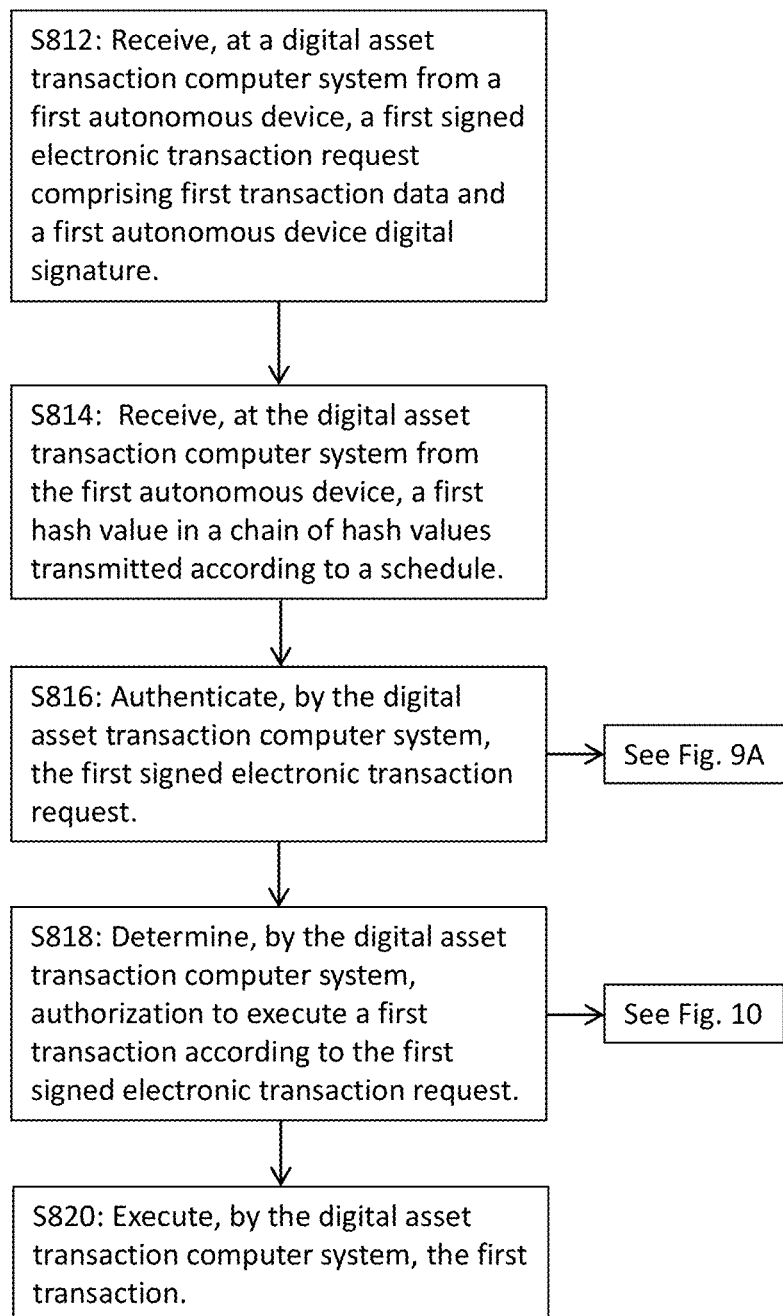

FIG. 8B is a flow chart of an exemplary process for performing transactions involving autonomous devices that generate an authentication hash chain and transmit the newest value of the hash chain to a transaction computer system according to a schedule to establish device authenticity. The authentication hash value may thus be transmitted independently of any transaction request and/or may be transmitted with greater frequency than transaction requests. In embodiments, transmission of the authentication hash value may be triggered by an electronic transaction request (or preparation to send an electronic transaction request), and the authentication hash value may be transmitted separately from the transaction request.

In a step S812, a digital asset transaction computer system may receive from a first autonomous device a first signed electronic transaction request comprising first transaction data and a first autonomous device digital signature.

In a step S814, the digital asset transaction computer system may receive from the first autonomous device, a first hash value in a chain of hash values transmitted according to a schedule.

In a step S816, the digital asset transaction computer system may authenticate the first signed electronic transaction request as described herein with respect to FIG. 9A.

In a step S818, the digital asset transaction computer system may determine authorization to execute a first transaction according to the first signed electronic transaction request as described herein with respect to FIG. 10.

In a step S820, the digital asset transaction computer system may execute the first transaction.

Figure 8C:
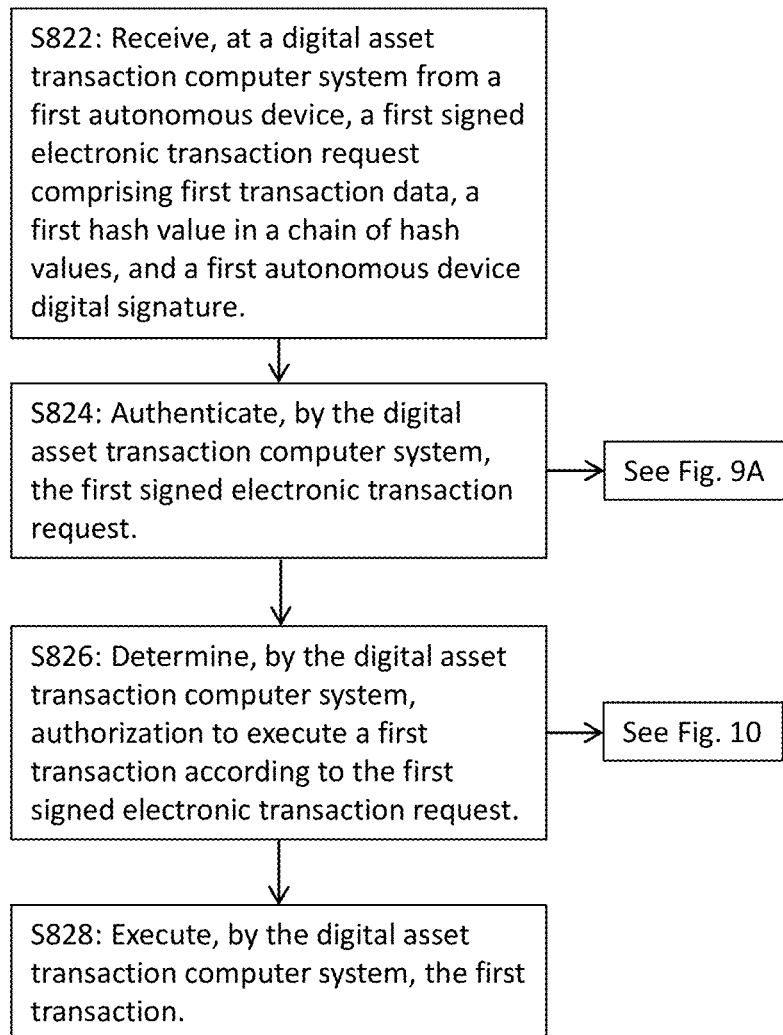

FIG. 8C is a flow chart of an exemplary process for performing transactions involving autonomous devices that generate an authentication hash chain and transmit the newest value of the hash chain to a transaction computer system along with an electronic transaction request to establish device authenticity. The authentication hash value may thus be transmitted along with each transaction request.

In a step S822, a digital asset transaction computer system may receive from a first autonomous device a first signed electronic transaction request comprising first transaction data, a first hash value in a chain of hash values, and a first autonomous device digital signature.

In a step S824, the digital asset transaction computer system may authenticate the first signed electronic transaction request as described herein with respect to FIG. 9A.

In a step S826, the digital asset transaction computer system may determine authorization to execute a first transaction according to the first signed electronic transaction request as described herein with respect to FIG. 10.

In a step S828, the digital asset transaction computer system may execute the first transaction.

Figure 8D:
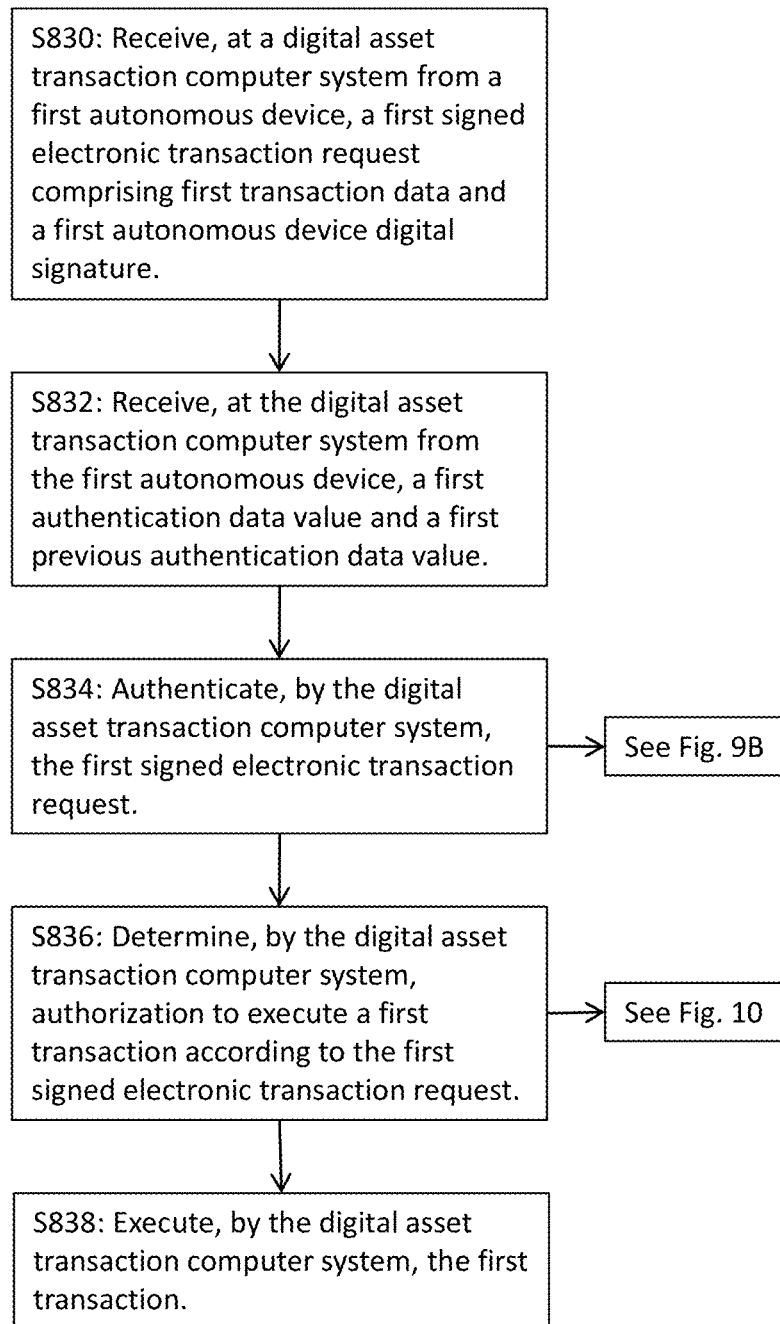

FIG. 8D is a flow chart of an exemplary process for performing transactions involving autonomous devices that transmit a newest authentication data value as well as the previous authentication data value a transaction computer system to establish device authenticity. An authentication data value may be a randomly generated number. In embodiments, an authentication data value may be a hash value, which may be part of a chain of hash values. An authentication data value may be or may be based at least in part upon a timestamp, device location, and/or device identifier, to name a few.

In a step S830, a digital asset transaction computer system may receive from a first autonomous device, a first signed electronic transaction request comprising first transaction data and a first autonomous device digital signature.

In a step S832, the digital asset transaction computer system may receive from the first autonomous device, a first authentication data value and a first previous authentication data value.

In a step S834, the digital asset transaction computer system may authenticate the first signed electronic transaction request.

In a step S836, the digital asset transaction computer system may determine authorization to execute a first transaction according to the first signed electronic transaction request.

In a step S838, the digital asset transaction computer system may execute the first transaction.

Figure 8E:
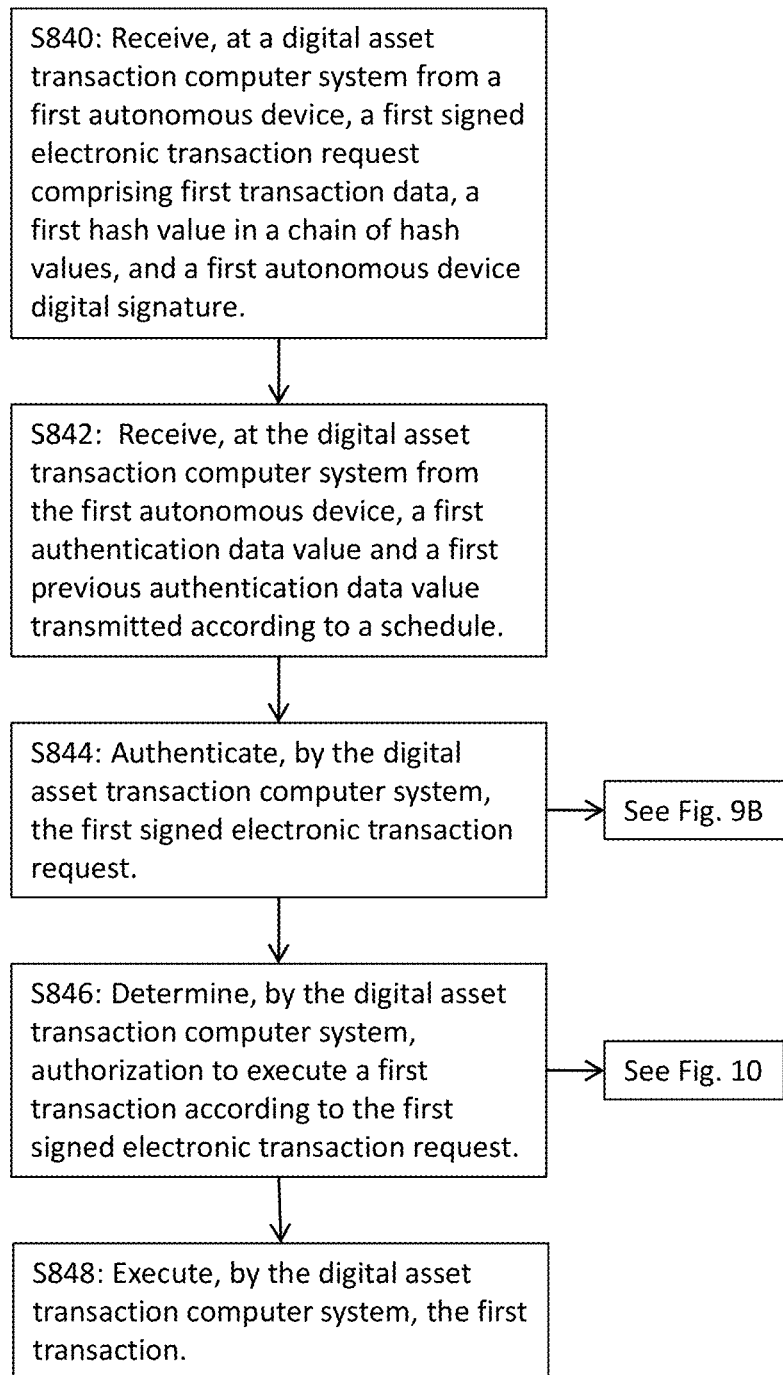

FIG. 8E is a flow chart of an exemplary process for performing transactions involving autonomous devices that transmit a newest authentication data value as well as the previous authentication data value to a transaction computer system according to a schedule to establish device authenticity. In embodiments, the schedule may be predefined and/or periodic or randomized. The authentication data values may be transmitted independently from transaction requests.

In a step S840. a digital asset transaction computer system may receive from a first autonomous device, a first signed electronic transaction request comprising first transaction data, a first hash value in a chain of hash values, and a first autonomous device digital signature.

In a step S842, the digital asset transaction computer system may receive from the first autonomous device, a first authentication data value and a first previous authentication data value transmitted according to a schedule.

In a step S844, the digital asset transaction computer system may authenticate the first signed electronic transaction request.

In a step S846, the digital asset transaction computer system may determine authorization to execute a first transaction according to the first signed electronic transaction request.

In a step S848, the digital asset transaction computer system may execute the first transaction.

Figure 8F:
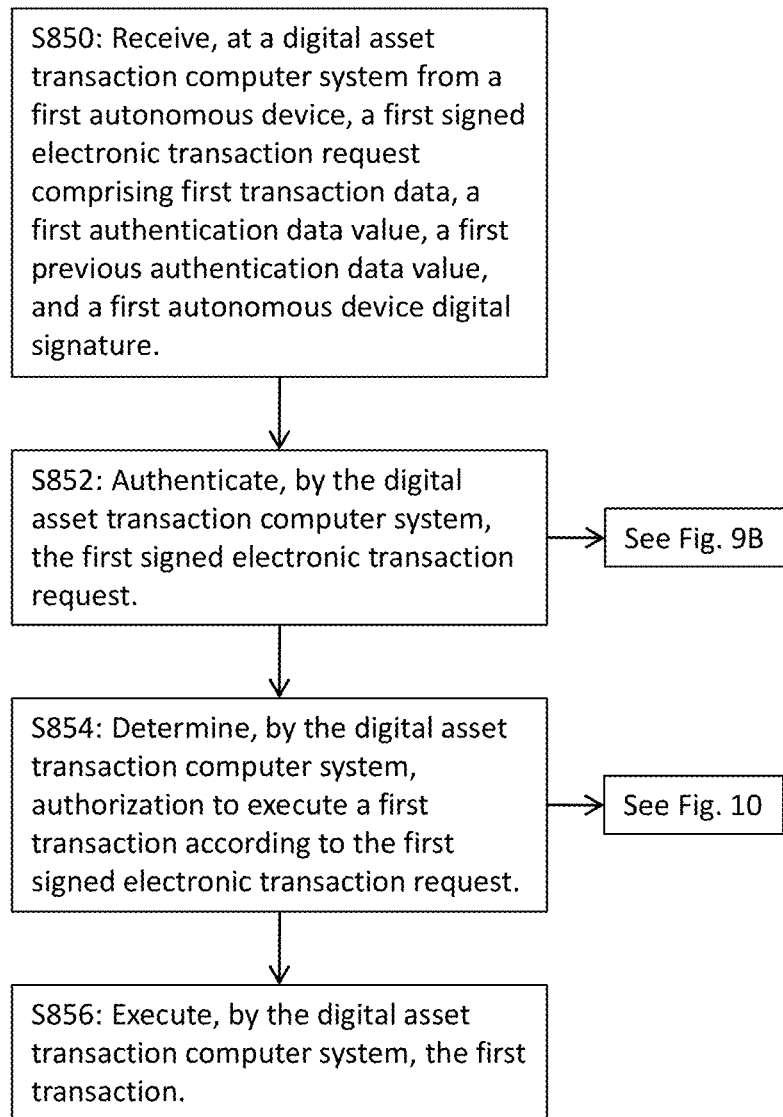

FIG. 8F is a flow chart of an exemplary process for performing transactions involving autonomous devices that transmit a newest authentication data value as well as the previous authentication data value to a transaction computer system along with an electronic transaction request to establish device authenticity.

In a step S850, a digital asset transaction computer system may receive from a first autonomous device, a first signed electronic transaction request comprising first transaction data, a first authentication data value, a first previous authentication data value, and a first autonomous device digital signature.

In a step S852, the digital asset transaction computer system may authenticate the first signed electronic transaction request.

In a step S854, the digital asset transaction computer system may determine authorization to execute a first transaction according to the first signed electronic transaction request.

In a step S856, the digital asset transaction computer system may execute the first transaction.

Figure 9B:
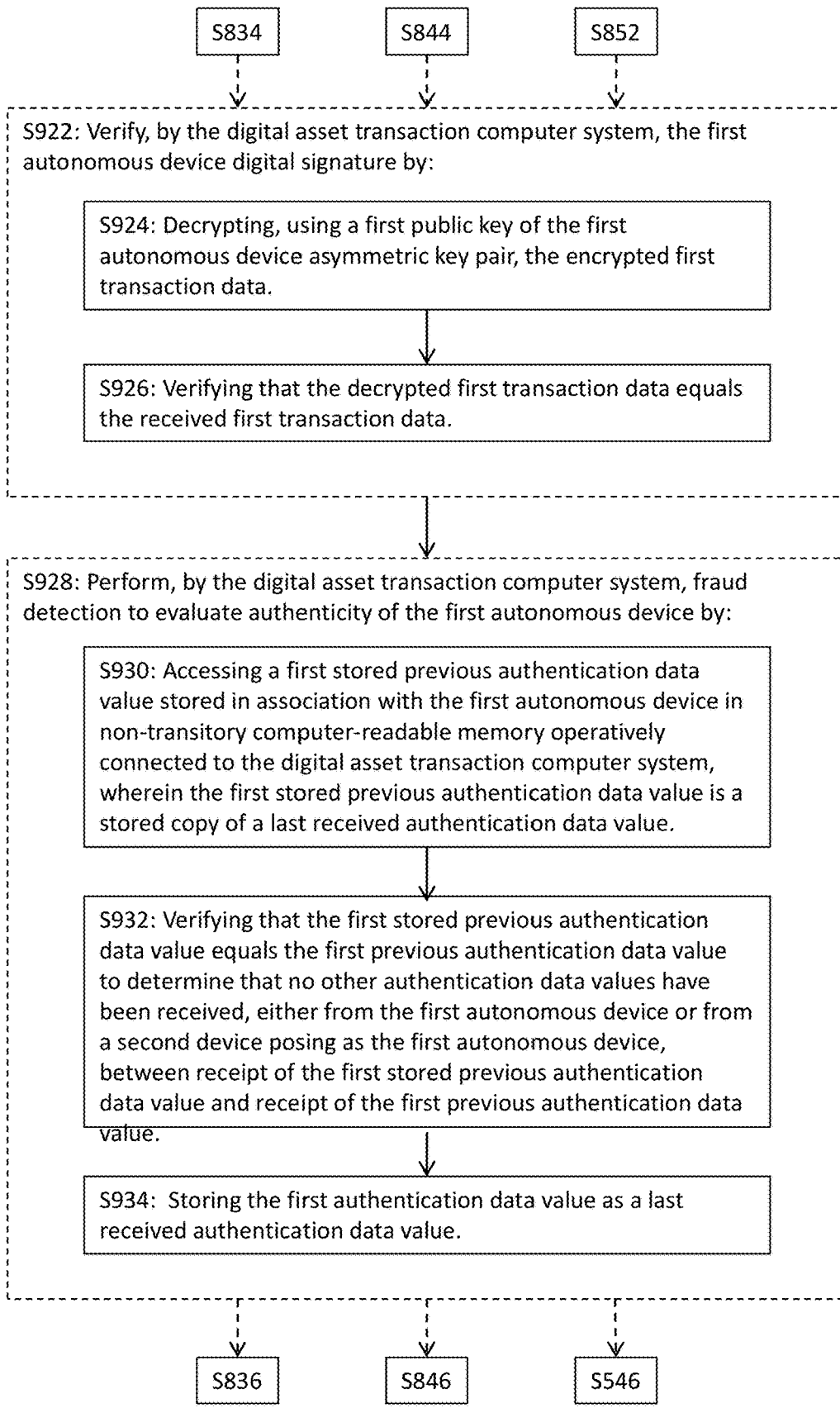

FIGS. 9A-B are flow charts of exemplary processes for authenticating electronic transaction requests in accordance with exemplary embodiments of the present invention.

FIG. 9A shows an authentication process wherein the transaction computer system computes a verification hash value to compare against a received hash value of a chain of hash values. The verification hash value is computed based in part upon the last received hash value, and if the output does not match the newly received hash value, then there was a discrepancy in the last received hash value, meaning the last received hash value stored at the transaction computer system does not match the last hash value used at the autonomous device to generate its latest hash value.

In a step S902, the digital asset transaction computer system may verify the first autonomous device digital signature. Such verification may be performed by, in a step S904, decrypting, using a first public key of the first autonomous device asymmetric key pair, the encrypted first transaction data, and in a step S906, verifying that the decrypted first transaction data equals the received first transaction data.

In a step S908, the digital asset transaction computer system may perform fraud detection to evaluate authenticity of the first autonomous device. To perform fraud detection, the computer system may, in a step S910, access a first stored previous hash value stored in association with the first autonomous device in non-transitory computer-readable memory operatively connected to the digital asset transaction computer system, wherein the first stored previous hash value is a stored copy of a last received hash value. Then, in a step S912, the computer system may computer a verification hash value by applying the hash algorithm to the first new data and the first stored previous hash value. In a step S914, the computer system may verify that the verification hash value equals the first hash value to determine that no other hash values have been received, either from the first autonomous device or from a second device posing as the first autonomous device, between receipt of the first previous hash value and receipt of the first hash value.

In a step S916, the digital asset transaction computer system may store the first authentication hash value as a last received authentication hash value, which may be used in the next authentication cycle. In embodiments, a currently stored copy of the last received authentication hash value may be replaced by the first authentication hash value.

FIG. 9B shows an authentication process wherein the transaction computer system receives a previous authentication data value along with a new authentication data value and compares the previous authentication data value against a stored copy of a last received authentication data value to determine whether they match.

In a step S922, the digital asset transaction computer system may verify the first autonomous device digital signature. The digital signature may be verified by, in a step S924, decrypting, using a first public key of the first autonomous device asymmetric key pair, the encrypted first transaction data, and in a step S926, verifying that the decrypted first transaction data equals the received first transaction data.

In a step S928, the digital asset transaction computer system may perform fraud detection to evaluate authenticity of the first autonomous device. Fraud detection may be performed by, in a step S930, accessing a first stored previous authentication data value stored in association with the first autonomous device in non-transitory computer-readable memory operatively connected to the digital asset transaction computer system, wherein the first stored previous authentication data value is a stored copy of a last received authentication data value. Then, in a step S932, the computer system may verify that the first stored previous authentication data value equals the first previous authentication data value to determine that no other authentication data values have been received, either from the first autonomous device or from a second device posing as the first autonomous device, between receipt of the first stored previous authentication data value and receipt of the first previous authentication data value.

In a step S934, the digital asset transaction computer system may store the first authentication data value as a last received authentication data value, so that it can be used in the next authentication cycle.

FIG. 10 is a flow chart of an exemplary process for determining transaction authorization according to transaction rules in accordance with exemplary embodiments of the present invention. In embodiments, the digital asset transaction computer system may determine whether a device has been flagged, such as by previously failing the fraud detection process (or a device posing as the device previously failing such fraud detection). In embodiments, the digital asset transaction computer system may determine may determine whether a device owner or operator or an account owner or administrator has placed restrictions on the device or the account and/or revoked authorization for the device or the account.

In a step S1002, the digital asset transaction computer system may identify a first account associated with the first autonomous device. In embodiments, the first account may be a master account to which a sub-account associated with the first autonomous device is subordinate. In embodiments, the first account may be a sub-account. In embodiments, the first transaction rules may be linked to the first autonomous device and/or may be linked to the first autonomous device via a device identifier or via the sending account identifier.

In a step S1004, the digital asset transaction computer system may retrieve from a first database first transaction rules governing the allowable transactions associated with the first account. In embodiments, the first database may be remotely located and/or may be maintained by a device owner or operator or an account owner or administrator.

In a step S1006, the digital asset transaction computer system may evaluate the first transaction rules at least with respect to the first transaction data. If the first transaction data violates any of the first transaction rules, the transaction may not be authorized.

In embodiments, the regulatory compliance and/or transaction authorization processes described herein may be used, instead of by an autonomous device, by a company with a sub-account tied to an individual authorized to act on behalf of the company.

In embodiments, one or more devices or autonomous devices may be configured to interact with the digital transaction computer system according to the processes described herein.

In embodiments, an autonomous device can comprise one or more processors and non-transitory computer-readable memory operatively connected to the one or more processors and having stored thereon computer-readable instructions to perform the steps of generating, by the autonomous device, a first hash value of a chain of hash values by applying a hash algorithm to first data including first new data and a first previous hash value of the chain of hash values, the first previous hash value computed by applying the hash algorithm to first previous data; transmitting, from the autonomous device to a digital asset transaction computer system, the first hash value and the first new data; generating, by the autonomous device, a first signed electronic transaction request comprising (1) first transaction data comprising a sending account identifier associated with the first autonomous device, a destination account identifier, a transaction amount, and a timestamp, and (2) a first autonomous device digital signature generated using a first private key of a first autonomous device asymmetric key pair; and transmitting, from the autonomous device to the digital asset transaction computer system, the first signed electronic transaction request.

In embodiments, the first new data can comprise at least a portion of the first signed electronic transaction request. In embodiments, the first new data can comprise a timestamp. In embodiments, the first new data can comprise position data associated with a location of the autonomous device.

In embodiments, the first hash value may be generated and transmitted according to a periodic schedule for the chain of hash values.

The embodiments, the autonomous device may be further configured to perform the steps of receiving, at the autonomous device from a destination device associated with the destination account identifier, a signed electronic offer comprising the destination account identifier, the transaction amount, and a destination device digital signature generated using a second private key of a destination device asymmetric key pair, and providing, from the autonomous device to the digital asset transaction computer system, the signed electronic offer.

In embodiments, a digital asset transaction computer system may receive from a first autonomous device a first signed electronic transaction request. The first signed electronic transaction request may comprise first transaction data, which may comprise a sending account identifier associated with the first autonomous device, a destination account identifier, a transaction amount, and a timestamp. The first transaction data may further comprise a first autonomous device digital signature generated using a first private key of a first autonomous device asymmetric key pair to encrypt the first transaction data.

The digital asset transaction computer system may receive from the first autonomous device a first hash value in a chain of hash values, wherein the first hash value was computed by applying a hash algorithm to first data including first new data and a first previous hash value in the chain of hash values, the first previous hash value computed by applying the hash algorithm to first previous data not including the first new data.

The digital asset transaction computer system may authenticate the first signed electronic transaction request by (1) verifying the first autonomous device digital signature by decrypting, using a first public key of the first autonomous device asymmetric key pair, the encrypted first transaction data, and verifying that the decrypted first transaction data equals the received first transaction data, and (2) performing fraud detection to evaluate authenticity of the first autonomous device by accessing a first stored previous hash value stored in association with the first autonomous device in non-transitory computer-readable memory operatively connected to the digital asset transaction computer system, wherein the first stored previous hash value is a stored copy of the previous hash value, computing a verification hash value by applying the hash algorithm to the first new data and the first stored previous hash value, and verifying that the verification hash value equals the first hash value to determine that no other hash values have been received, either from the first autonomous device or from a second device posing as the first autonomous device, between receipt of the first previous hash value and receipt of the first hash value.

The digital asset transaction computer system may determine authorization to execute a first transaction according to the first signed electronic transaction request by identifying a first account associated with the first autonomous device, retrieving, from a first database, first transaction rules governing the allowable transactions associated with the first account, and evaluating the first transaction rules at least with respect to the first transaction data. The digital asset transaction computer system may the execute the first transaction.

In embodiments, the first account may be a first sub-account subordinate to a master digital asset account.

In embodiments, the first transaction rules may be unique to the first sub-account. The first transaction rules may be associated with the master account and apply to a plurality of sub-accounts subordinate to the master account including the first sub-account.

In embodiments, the first hash value is received along with the first signed electronic transaction request. In embodiments, the first hash value may be received as part of a periodic transmission of hash values of the chain of hash values from the first autonomous device.

In embodiments, the first data may comprise at least a portion of the first signed electronic transaction request.

In embodiments, the digital asset transaction computer system may transmit to an electronic address associated with the destination account identifier an electronic indication of an identity associated with the first autonomous device. In embodiments, the electronic indication of the identity associated with the first autonomous device may comprise an identification of the owner of the master account.

In embodiments, executing the first transaction may comprise transmitting, by the digital asset transaction computer system to a digital asset network, an electronic indication of the executed transaction for inclusion in a distributed public electronic ledger that records digital asset transactions among nodes in the digital asset network.

In embodiments, the digital asset transaction computer system may transmit to a destination autonomous device associated with the destination account identifier an electronic indication of the executed transaction.

In embodiments, the digital asset transaction computer system may receive from a second device a second signed electronic transaction request comprising (1) second transaction data comprising the sending account identifier associated with the first autonomous device, a second destination account identifier, a second transaction amount, and a second timestamp, and (2) an apparent autonomous device digital signature generated using the first private key of the first autonomous device asymmetric key pair. The digital asset transaction computer system may receive from the second device, a second hash value and second new data and verify the validity of the second signed electronic transaction request by (1) verifying using the first public key of the first autonomous device asymmetric key pair, the apparent autonomous device digital signature, and (2) evaluating the authenticity of the second device by accessing a second stored previous hash value stored in association with the first autonomous device in the non-transitory computer-readable memory, computing a second verification hash value by applying the hash algorithm to the second new data and the second stored previous hash value, and determining that the second verification hash value does not equal the second hash value. The digital asset transaction computer system may reject the second signed electronic transaction request. The digital asset transaction computer system may store a warning indicator to reject future transaction requests apparently received from the first autonomous device.

In embodiments, the digital asset transaction computer system may, prior to executing the first transaction, receive a signed electronic offer comprising the destination account identifier, the transaction amount, and a destination device digital signature generated using a second private key of a destination device asymmetric key pair. The digital asset transaction computer system may verify that the destination account identifier is associated with a digital asset account having an owner with an identity known to the digital asset transaction computer system. In embodiments, the signed electronic offer may be received from a destination autonomous device associated with the destination account identifier. In embodiments, the signed electronic offer may be received from the first autonomous device, which received the signed electronic offer from a destination autonomous device associated with the destination account identifier.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. An autonomous device comprising:
 (a) one or more processors;
 (b) non-transitory computer-readable memory operatively connected to the one or more processors and having stored thereon computer-readable instructions to perform the steps of:
  (i) storing, in a secure memory of the autonomous device, a device private key, where the device private key corresponds to a device public key;
  (ii) receiving, at the autonomous device from a destination device, an electronic offer to provide at least one of goods and services in exchange for a transaction amount of digital assets, the electronic offer comprising a destination account identifier associated with a receiving account of the destination device;
  (iii) generating, by the autonomous device, a transaction message with instructions to transfer the transaction amount of digital assets from the autonomous device account associated with the autonomous device to the receiving account, wherein the transaction message includes a digital signature of the autonomous device based on the device private key;
  (iv) publishing, by the autonomous device, the transaction message to a plurality of geographically distributed computer systems that maintain a distributed transaction ledger associated with the digital asset in the form of a blockchain;
 wherein the transaction is executed by the plurality of geographically distributed computer systems and the distributed ledger is updated to reflect the transfer of the transaction amount of digital assets from the autonomous device account to the receiving account associated with the destination device.

2. The autonomous device of claim 1, wherein the device public key is also linked to an authorized user of a digital asset exchange.

3. The autonomous device of claim 1, wherein the autonomous device account is a first sub-account subordinate to a master digital account and the master digital asset account is associated with a particular owner and authorized user of a digital asset exchange.

4. The autonomous device of claim 3, wherein the transaction is performed in accordance with first transaction rules that are unique to the autonomous device account.

5. The autonomous device of claim 4, wherein the first transaction rules are associated with the master account and apply to a plurality of sub-accounts subordinate to the master account including the first sub-account.

6. The autonomous device of claim 1, wherein the autonomous device is an autonomous vehicle and the goods exchanged for the transaction amount of digital assets include fuel for the autonomous vehicle.

7. The autonomous device of claim 1, wherein the autonomous device is an autonomous vehicle and goods exchanged for the transaction amount of digital assets include electricity for the autonomous vehicle.

8. The autonomous device of claim 1, wherein the autonomous device is an autonomous vehicle and the transaction amount of digital assets is associated with a toll.

9. The autonomous device of claim 1, wherein the autonomous device is an appliance and the services exchanged for the transaction amount of digital assets include at least one of maintenance and repair of the appliance.

10. The autonomous device of claim 1, wherein the publishing step is performed via a communication system associated with a transaction computer system included in the autonomous device.

11. A method comprising:
(a) storing, by a first autonomous device, in a secure memory of the autonomous device, a device private key, where the device private key corresponds to a device public key;
(b) receiving, at the autonomous device, from a destination device, an electronic offer to provide at least one of goods and services to the first autonomous device in exchange for a transaction amount of digital assets, the electronic offer comprising a destination account identifier associated with a receiving account of the destination device;
(c) generating, by the autonomous device, a transaction message with instructions to transfer the transaction amount of digital assets from an autonomous device account associated with the first autonomous device, to the receiving account, wherein the transaction message includes a digital signature of the autonomous device based on the device private key;
(d) publishing, by the first autonomous device, the transaction message to a plurality of geographically distributed computer systems that maintain a distributed transaction ledger associated with the digital asset in the form of a blockchain;
wherein the transaction is executed by the plurality of geographically distributed computer systems and the distributed ledger is updated to reflect the transfer of the transaction amount of digital assets from the autonomous device account to the receiving account associated with the destination device.

12. The method of claim 11, wherein the transaction is performed in accordance with first transaction rules unique to the autonomous device account.

13. The method of claim 12, wherein the autonomous device account is a first sub-account subordinate to a master digital account and the first transaction rules are associated with the master digital account and apply to a plurality of sub-accounts subordinate to the master digital account including the first sub-account.

14. The method of claim 13, further comprising:
transmitting, from the first autonomous device to an electronic address associated with the destination account identifier, an electronic indication of an identity associated with the first autonomous device.

15. The method of claim 14, wherein the electronic indication of the identity associated with the first autonomous device comprises an identification of an owner of the master account.

16. The method of claim 11, wherein the first autonomous device is an autonomous vehicle and the goods exchanged for the transaction amount of digital assets include fuel for the autonomous vehicle.

17. The method of claim 11, wherein the first autonomous device is an autonomous vehicle and the goods exchanged for the transaction amount of digital assets include electricity for the autonomous vehicle.

18. The method of claim 11, wherein the first autonomous device is an autonomous vehicle and the transaction amount of digital assets is associated with a cost of a toll.

19. The method of claim 11, wherein the first autonomous device is an appliance and services exchanged for the transaction amount of digital assets include at least one of maintenance and repair of the appliance.

20. The method of claim 11, wherein the publishing step is performed via a communication system associated with a transaction computer system included in the first autonomous device.

* * * * *